United States Patent
Castro et al.

(10) Patent No.: US 9,632,244 B2
(45) Date of Patent: Apr. 25, 2017

(54) MULTIMODE OPTICAL FIBER AND METHODS OF MANUFACTURING THEREOF

(71) Applicant: Panduit Corp., Tinley Park, IL (US)

(72) Inventors: Jose M. Castro, Lombard, IL (US); Richard J. Pimpinella, Frankfort, IL (US); Bulent Kose, Burr Ridge, IL (US); Brett Lane, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 46 days.

(21) Appl. No.: 14/806,273

(22) Filed: Jul. 22, 2015

(65) Prior Publication Data

US 2016/0025923 A1 Jan. 28, 2016

Related U.S. Application Data

(60) Provisional application No. 62/029,659, filed on Jul. 28, 2014.

(51) Int. Cl.
  *G02B 6/028* (2006.01)
  *G02B 6/02* (2006.01)

(52) U.S. Cl.
  CPC ........ *G02B 6/0288* (2013.01); *G02B 6/02257* (2013.01)

(58) Field of Classification Search
  None
  See application file for complete search history.

(56) References Cited

U.S. PATENT DOCUMENTS

| | | | | |
|---|---|---|---|---|
| 3,904,268 A | * | 9/1975 | Keck | G02B 6/0288 385/124 |
| 3,989,350 A | * | 11/1976 | Cohen | C03B 37/01807 385/124 |
| 4,105,283 A | * | 8/1978 | Gloge | G02B 6/0288 385/124 |

(Continued)

OTHER PUBLICATIONS

Written opinion for PCT/US2015/041963, mailing date Nov. 25, 2015.*

(Continued)

*Primary Examiner* — Mike Stahl
(74) *Attorney, Agent, or Firm* — Christopher S. Clancy; James H. Williams; Yuri Astvatsaturov

(57) ABSTRACT

The present invention generally relates to the field of fiber optics, and more particularly, to apparatuses, systems, and methods directed towards improving effective modal bandwidth within a fiber optic communication environment. In an embodiment, a multimode optical fiber in accordance with the present invention comprises a core and cladding material system where the refractive indices of the core and cladding are selected to modify the shape of the profile dispersion parameter, y, as a function of wavelength in such a way that the alpha parameter (α-parameter), which defines the refractive index profile, produces negative relative group delays over a broad range of wavelengths. The new shape of the profile dispersion parameter departs from traditional fibers where the profile dispersion parameter monotonically decreases around the selected wavelength that maximizes the effective modal bandwidth (EMB).

20 Claims, 36 Drawing Sheets

(56) References Cited

U.S. PATENT DOCUMENTS

| | | | | |
|---|---|---|---|---|
| 4,205,900 | A * | 6/1980 | Eve | G02B 6/268 385/100 |
| 7,421,174 | B2 * | 9/2008 | Fleming, Jr. | G02B 6/03627 385/123 |
| 2005/0013570 | A1 | 1/2005 | Guan et al. | |
| 2011/0037183 | A1 | 2/2011 | Tudury et al. | |
| 2014/0086577 | A1 | 3/2014 | Chen et al. | |
| 2014/0241685 | A1 * | 8/2014 | Pimpinella | G02B 6/02214 385/124 |

OTHER PUBLICATIONS

Robert Olshansky et al: "Pulse broadening in graded-index optical fibers", Applied Optics, vol. 15, No. 2, Feb. 1, 1976, p. 483, XP001622677.

* cited by examiner

MULTIMODE OPTICAL FIBER AND METHODS OF MANUFACTURING THEREOF

CROSS-REFERENCE TO RELATED APPLICATIONS

This application claims the benefit of U.S. Provisional Patent Application No. 62/029,659 filed on Jul. 28, 2014, which is incorporated herein by reference in its entirety.

FIELD OF INVENTION

The present invention generally relates to the field of fiber optics, and more particularly, to apparatuses, systems, and methods directed towards improving effective modal bandwidth within a fiber optic communication environment.

BACKGROUND

The majority of optical channels utilized in premise networks such as local area networks (LAN) or storage area networks (SAN) utilize intensity modulated lasers, where the transmitters modulate the power or intensity of the light. Vertical-cavity surface-emitting laser (VCSEL) transceivers widely deployed in data centers are examples of intensity modulated transceivers, where on-off keying (OOK) is used. VCSEL transceivers have certain advantages including low cost, high reliability, and low power consumption compared to some other types of lasers used in communication systems.

Commercially available VCSEL transceivers with emission wavelengths closely centered around 850 nm, typically 850 nm±10 nm, can support data rates up to 10 Gbps and 14.025 Gbps for Ethernet and Fiber Channel applications, respectively, for channel lengths less than 400 m. Moreover, industry standards for SAN operating at 25 Gbps and 28 Gbps over reduced channel lengths are expected to be released in the future. However, there are limitations to increasing data rates using VCSELs operating at a central wavelength of 850 nm.

As demand for higher data rates continues to grow, the pursuit of cost effective and efficient methods to increase transmission capacity are actively underway. The attributes of some of these transmission methods include WDM, spatial division multiplexing using parallel fiber optics, and advance modulation formats that allow more spectral efficiency than OOK. However, difficulties still exist when attempting to operate at increased data rates. For example, for the aforementioned approaches it is challenging to make reliable VCSELs operating in the 850 nm spectral window fast enough to achieve data rates above 40 Gbps.

It is known by those skilled in the art that VCSEL modulation rates may be increased via the incorporation of indium into material composition of the laser quantum well structure. However, so doing results in the increase of the laser emission wavelength.

Multimode fibers (MMFs) deployed in data centers and premises networks are currently optimized for a narrow spectral window around 850 nm, or less commonly around 1300 nm. These laser-optimized MMFs typically have a core diameter of about 50 μm and modal bandwidth (i.e., EMB) ranging from 2000 MHz·km to at least 4700 MHz·km when measured at 850 nm.

An important dispersive phenomenon in an MMF is a result of modal and chromatic dispersion, and can be described as follows. With respect to chromatic dispersion, a pulse launched into a given mode propagates at a group velocity of the mode and if the pulse has a finite spectral width, the pulse spreads out in time due to material (or chromatic) dispersion. Chromatic dispersion is caused by the wavelength dependence of the material refractive index and results in a difference in propagation speeds for each of the spectral components comprising the transmitted pulse. Chromatic dispersion increases with spectral width and in high-speed VCSELs, the RMS spectral width can be as broad as 0.65 nm. Consequently, in high-speed VCSEL-MMF channels, the chromatic dispersion can become a significant penalty limiting the allowable reaches for accurate transmission.

With respect to modal dispersion, when several mode groups are excited and propagate through the fiber, the transmitted pulse broadens due to differences in mode group velocities transporting the optical signal. These differences can be attributed to imperfections in the refractive index profile and/or differences between the ideal and actual operating wavelength(s) of a transmitter. In laser-optimized fibers the refractive index profile is designed to equalize the mode group delays (or speeds) for the supported mode groups, thereby reducing modal dispersion and increasing the modal bandwidth.

The parameter that describes the refractive index profile is the α-parameter, and the refractive index profile is often referred to as the α-profile. In general, the refractive index profile is a distribution of refractive indices of materials within an optical fiber and for the core of an MMF the profile is defined by a function given by:

$$n(r) = n_1 \sqrt{1 - 2\Delta\left(\frac{r}{a}\right)^\alpha} \quad (1)$$

where $\Delta \approx (n_1 - n_2)/n_1$, $n_1$ is the refractive index on the axis of the fiber (i.e., at the center of the core), $n_2$ is the refractive index in the cladding, r is the radial position inside the fiber core, a is the core radius, and α is the exponent parameter which typically takes a value of ~2 for fibers designed to support operation near 850 nm.

From equation (1), one can derive a simplified expression for the relative mode group delay $t_g$ as a function of the wavelength and the α-profile parameters as shown:

$$t_g(\lambda) = \frac{N_1(\lambda)}{c}\left[\Delta\left(\frac{\alpha - \alpha_{opt}(\lambda)}{\alpha + 2}\right) \cdot \left(\frac{v_g}{v_t}\right)^{\alpha/(\alpha+2)} + \ldots\right] \quad (2)$$

where c is the speed of light in the vacuum, g is the mode group (MG) index (a mode group can comprise those modes that have nearly equal propagation constants), $v_g$ is the number of modes inside the MG that have a propagation constant larger than $\beta_g(v)$, $v_T$ is the total number of modes, $N_1$ is the group refractive index of the core material at r=0 and, λ is the optical source wavelength.

The optimum alpha value $\alpha_{opt}$ that minimize group delay at a single operational wavelength λ and γ the profile dispersion parameter are given by $$\alpha_{opt}(\lambda) = 2 + y(\lambda) - \Delta\frac{(4 + y(\lambda))(3 + y(\lambda))}{5 + 2y(\lambda)} \quad (3)$$

where,

-continued $$y(\lambda) = -\frac{2n_1}{N_1} \frac{\lambda}{\Delta} \frac{d\Delta}{d\lambda} \quad (4)$$

Using equations (2-4) the peak effective modal bandwidth valued of $\lambda_p$ can be approximated to:

$$\lambda_p \approx -(\alpha - 2)\left(\frac{2n_1}{\Delta N_1} \Delta \frac{d\Delta}{d\lambda}\right)^{-1} \quad (5)$$

The modal bandwidth of laser-optimized MMF is characterized by measuring its differential mode delay (DMD) or effective modal bandwidth; metrics standardized within domestic and international standards organizations and known to those skilled in the relevant art. The DMD test method describes a procedure for launching a temporally short and spectrally narrow pulse (reference pulse) from a single-mode fiber (SMF) into the core of an MMF at various radial offsets. After propagating through the MMF, the pulses are received by a photodetector which captures the MMF core power. After removal of the reference pulse temporal width, the DMD temporal width can be determined at the 25% threshold level between the first leading edge and the last trailing edge of all traces encompassed between specified radial positions. The EMB is estimated by the Fourier domain deconvolution of the input pulse from a weighted sum of the received signals for each radial offset launch. The set of weight values utilized in the computation can belong to a set of ten representative VCSELs.

The relation between modal bandwidth, total bandwidth, and the fiber design parameters can be obtained from equation (2). In this equation, the magnitude of the term $(\alpha-\alpha_{opt})$ is proportional to the mode group delays and therefore inversely related with modal bandwidth. On the other hand the sign of $(\alpha-\alpha_{opt})$ determines the tilt or slope of the group delays with increasing radial offsets which is important for the computation of the modal-chromatic dispersion interaction (MCDI) and total bandwidth when this fiber is utilized with VCSEL based transceivers as described below.

To illustrate this concept and further clarify the meaning of the DMD slope and sign, consider the two simulated alpha-profile MMFs shown in FIG. 1. In this figure the horizontal axis is the relative time delays (ps/m) of the excited radial mode groups measured at the detector. The vertical axis represents the mode group pulse waveform amplitude for each radial offset of the SMF launch fiber. The lines inside each DMD pulse represent the discrete mode groups of the fibers, which are identical in both DMD plots (a) and (b). For each DMD plot one can compute a least square error (LSE) line connecting the pulses' centroids. The sign of the connecting line slope can be utilized to classify the fibers as left-shifted (L-MMF) (i.e., negative slope), or right-shifted (R-MMF) (i.e., positive slope). Since the magnitudes of the slopes of the radial pulse centroids for these two simulated fibers are identical, the DMD and calculated modal bandwidth (EMB) are the same.

For the L-MMF (negative DMD slope) higher order modes travel faster than lower order modes as can be observed from their shorter arrival time to the detector, herein referred to as negative relative group delay. Conversely, for the R-MMF (positive DMD slope) higher order modes travel slower than lower order modes.

In VCSEL-MMF channels the estimation of the total channel bandwidth depends on the interaction of the spectral dependent coupling of the VCSEL modes to the fiber modes. This coupling produces a mode spectral bias (MSB), where shorter VCSEL wavelengths tend to couple into higher order fiber modes and longer VCSEL wavelengths tend to couple into lower order fiber modes. Consequently, the difference in mode group delays is a result of both modal and chromatic dispersion effects. The effect of MSB on group velocity is summarized Table I:

TABLE I

MCDI: Effect of MSB in MMF mode speed.

| MMF Modes | MMF Mode Spectra | Spectra Effect on Group Velocity |
|---|---|---|
| Higher order modes | Transport energy of lower regions of the VCSEL spectrum (Shorter wavelengths) | Reduced velocity |
| Lower order modes | Transport energy of higher regions of the VCSEL spectrum (Longer wavelengths) | Increased velocity |

In general, MSB leads to MCDI which, depending on the α-profile, can either increase or reduce the total channel bandwidth. In order to utilize MCDI to increase the channel bandwidth the group velocities of the higher-order modes (HOMs) must propagate faster than the lower-order modes (LOMs) when measured at the operational wavelength of the VCSEL based transceiver. This condition produces a DMD profile and slope sign similar to the one shown in FIG. 1 for the L-MMFs. Since HOMs carry the shorter wavelengths of the VCSEL spectrum, it is possible to compensate for their reduced speed caused by chromatic dispersion effects. When combined with the propagation speed of the LOMs, the resultant speeds of the modes tend to equalize as they propagate in the MMF. This modal-chromatic dispersion interaction and compensation has been further detailed in Gholami A., Molin, D., Sillard, P., "Physical Modeling of 10 GbE Optical Communication Systems," IEEE OSA JLT, 29(1), 2011, pp. 115-123; J. Castro, R. Pimpinella, B. Kose, and B. Lane, "Investigation of the Interaction of Modal and Chromatic Dispersion in VCSEL-MMF Channels," IEEE OSA JLT, 30(15), pp. 2532-2541; R. Pimpinella, J. Castro, B/Kose, and B. Lane, "Dispersion Compensated Multimode Fiber," Proceeding of the 60th IWCS 2011; and J. Castro, R. Pimpinella, B. Kose, and B. Lane, "Mode Partition Noise and Modal-Chromatic Dispersion Interaction Effects on Random Jitter," IEEE OSA JLT, 31(15), pp. 2629-2638, all of which are incorporated herein by reference in their entirety. A summary of the effect of MSB on channel bandwidth is presented in Table II:

TABLE II

Effect of mode spectral bias and DMD slope sign on channel bandwidth.

| Fiber | Without MSB | With MSB |
|---|---|---|
| L-MMF | HOM propagate faster than LOM | Reduced mode group velocity differences between HOMs and LOMs. Improved bandwidth |
| R-MMF | LOM propagate faster than HOM | Increased mode group velocity differences between HOMs and LOMs. Reduced bandwidth |

By intentionally compensating for modal and chromatic dispersion, benefits in achievable channel reach and bit error rate (BER) performance in L-MMF compared to R-MMF have been modeled and observed. In MMF channels using VCSEL based transceiver, it has been shown that MCDI can be used to not only reduce inter-symbol interference (ISI) penalties but also the mode partition noise (MPN). Conventional industry standard link models predict that MPN becomes an important penalty for longer reaches or higher data rates. An example of the improvements of BER when using L-MMF is shown in FIG. 2. In particular, this figure shows measured BER performance of a 10G VCSEL transceiver with 0.45 nm spectral width using two fibers with the same modal bandwidth of 4550 MHz·km and the same length 550 m but with opposite sign on the group delay slope. The L-MMF is represented by the solid trace. The R-MMF is represented in the dash trace. Typical gains of 2.5 dB in the optical budget have been observed experimentally with modal-chromatic dispersion compensated fibers depending on the running applications.

In MMF channels (such as for example VCSEL-MMF channels) operating at higher speeds, longer wavelengths, or in coarse-WDM (CWDM) systems, it would be advantageous to preserve the modal-chromatic dispersion compensation properties of current L-MMF. However, in conventional MMFs, the magnitude and sign of the mode group delay has high dependence on wavelength. Using current OM4 fibers it is not possible to maintain the L-MMF characteristics for the broad wavelength range required by CWDM. For example, assuming that an EMB of ≈4700 MHz·km is required by the application, the fiber behaves as L-MMF only in the spectral window of 815 nm to 850 nm.

This is further described with reference to FIG. 3 which shows a simulated $SiO_2$ MMF doped with $GeO_2$ (4.5 mol %) in the core and fluorine (1% WT) in the cladding, where $\Delta \approx 0.01$ at 850 nm. The utilized a value for this MMF is 2.049 which maximizes the EMB at $\lambda=850$ nm. The profile dispersion parameter and the optimum alpha are computed using equations (3-4) and are shown, respectively, on the left and right of FIG. 3. As can be seen from the figure, both of these values decrease monotonically as a function of increasing wavelength. The maximum EMB occurs at $\lambda=850$ nm, where $\alpha=\alpha_{opt}$. This condition produces the cancellation of the modal dependent terms in equation (2). Therefore, the group delays are equalized for all mode groups. As the wavelength varies, $\alpha_{opt}$ becomes larger or smaller than $\alpha$ producing negative or positive group delays as shown in equation (2). Therefore the same MMF can behave as an L-MMF or an R-MMF depending on relative position of the wavelength with respect to $\lambda_p$. More specifically, for wavelengths below $\lambda_p$ the DMD tilts to the left, as shown on the left side of FIG. 1, and therefore the fiber can be classified as a L-MMF with modal-chromatic dispersion compensation properties. On the other hand, for wavelengths over $\lambda_p$ the DMD tilts to the right and the fiber becomes a R-MMF, increasing total dispersion and degrading total channel bandwidth.

Using the mode group delays obtained via equation (2) and assuming the power distribution of the modes for ten representative VCSELs as described in the known DMD/EMB test standards, it is possible to estimate the EMB as a function of wavelength as shown in FIG. 4. This model is illustrated for a typical MMF construction with $\lambda_p=850$ nm and indicates that L-MMF properties (shaded area) and therefore modal-chromatic compensation can be provided in a limited spectral width that is less than 40 nm.

The simulated behavior is consistent with multiple experiments performed using MMFs of different grades: OM3 and OM4. In these experiments the EMB was measured at different wavelengths ranging from 800 nm to 960 nm, and the results of these measurements are shown in FIG. 5. In all cases, the L-MMF condition occurs only when the measured wavelength was below the $\lambda_p$ of each fiber (wavelength for peak EMB of each fiber). When an EMB>4700 MHz·km is required the spectral window for L-MMF becomes relatively limited.

An example of this characteristic is shown in FIGS. 6A and 6B which illustrate a typical MMF using Ge as a main dopant to increase the refractive index in the core. This dopant produces a monotonically decreasing alpha optimum distribution as shown by the solid line in FIG. 6A. When using $\alpha_d$ (illustrated by the dashed line) as the α-profile value for the fiber's refractive index, negative relative group delays are attained when $\alpha_d < \alpha_{opt}$. As a result, the high modal bandwidth for negative relative group delays (or L-MMF condition) is maintained for a relatively narrow spectral region. This is shown in FIG. 6B where the negative relative group delays are exhibited to the left of the peak EMB wavelength.

Based on the foregoing, existing approaches do not provide means to optimize modal bandwidth while at the same time produce MCDI for a broad range of optical wavelength. As such, there is a need to provide an improved MMF capable not only for large modal bandwidth, but also negative $t_g$ in a broad spectral window.

SUMMARY

Accordingly, at least in part the present specification is directed towards MMF that can provide increased EMB and negative relative group delays in broad spectral regions of the fiber.

In an embodiment, the present invention provides a means to achieve negative relative group delay in a relatively broad spectral window.

In another embodiment, the present invention provides a method for optimization of the modal bandwidth over a relatively broad spectral window which is an important factor in the channel dispersion limitations.

In yet another embodiment of the present invention, an MMF is used to enable CWDM (unidirectional or bi-directional) in multimode channels in which multiple VCSEL transceivers transmit and receive data simultaneously at different wavelengths.

In yet another embodiment of the present invention, an MMF is used for VCSEL transceivers operating at wavelength ≥850 nm, where the speed properties of the laser and chromatic dispersion of the fiber improve data rate and reach.

In yet another embodiment, a multimode optical fiber in accordance with the present invention comprises a core and cladding material system where the refractive indices of the core and cladding are selected to modify the shape of the profile dispersion parameter, y, as a function of wavelength in such a way that the alpha parameter (α-parameter), which defines the refractive index profile, produces negative relative group delays over a broad range of wavelengths. The new shape of the profile dispersion parameter departs from traditional fibers where the profile dispersion parameter monotonically decreases around the selected wavelength that maximizes the effective modal bandwidth (EMB).

In another embodiment, according to the principles of present invention, the dopants added to the fiber composition produce a concave or convex dispersion parameter profile with minimum value at or near to the wavelength $\lambda_p$ which has the peak EMB. The convex or concave shape of the profile dispersion parameter, y, broadens the range in which the fiber provides the desired modal bandwidth. More importantly, depending on the shape produced by y, the α-parameter is tuned to produce negative relative high-order group delay in a broad band of wavelengths. Negative relative high-order group delays result in the compensation of modal and chromatic dispersion in VCSEL channels which may enhance the total bandwidth up to or above 50%.

In yet another embodiment, multimode fibers manufactured in accordance with the present invention exceed the bandwidth provided by OM3 and/or OM4 fibers and at the same time compensate for modal and chromatic dispersion over a broad range of wavelengths. This can be useful in transceiver requirements for long wavelength VCSEL and/or coarse wavelength division multiplexed (WDM) systems.

In yet another embodiment, a MMF in accordance with the present invention provides higher channel bandwidth which translates to lower ISI and lower MPN penalties in VCSEL transceivers. Therefore, an MMF according to an embodiment of the present invention may enable faster data rates and/or longer reaches maintaining the cost and reliability advantages of VCSEL-MMF channels.

In yet another embodiment, the present invention is an MMF for operating within a spectral window, the MMF having one of a peak effective modal bandwidth or a minimum effective modal bandwidth at wavelength $\lambda_p$. The MMF includes a cladding having a refractive index of $n_2$, and a core, the core having a radius a and a refractive index profile comprised of refractive indices n(r) defined by a function of a radial distance r from a center of the core to a:

$$n(r) = n_1 \sqrt{1 - 2\Delta\left(\frac{r}{a}\right)^\alpha}$$

where $n_1$ is a refractive index at the center of the core, α is a parameter defining a shape of the refractive index profile, and $\Delta=(n_1-n_2)/n_1$. The core further has an $\alpha_{opt}$ profile comprised of values $\alpha_{opt}(\lambda)$ defined by a function of wavelength λ, where for a given λ the $\alpha_{opt}(\lambda)$ value minimizes a group delay of the MMF when the α is set equal to $\alpha_{opt}(\lambda)$, the $\alpha_{opt}$ profile having one of a concave shape with a maximum at $\alpha_{opt}(\lambda_p)$ or a convex shape with a minimum at $\alpha_{opt}(\lambda_p)$, where $\alpha \le \alpha_{opt}(\lambda_p)$.

In yet another embodiment, the present invention is an MMF for operating within a spectral window. The MMF includes a cladding having a refractive index of $n_2$, and a core, the core having a radius a and a refractive index profile comprised of refractive indices n(r) defined by a function of a radial distance r from a center of the core to a:

$$n(r) = n_1 \sqrt{1 - 2\Delta\left(\frac{r}{a}\right)^\alpha}$$

where $n_1$ is a refractive index at the center of the core, α is a parameter defining a shape of the refractive index profile, and $\Delta=(n_1-n_2)/n_1$. The core further has an $\alpha_{opt}$ profile comprised of values $\alpha_{opt}(\lambda)$ defined by a function of wavelength λ, where for a given λ the $\alpha_{opt}(\lambda)$ value minimizes a group delay of the MMF when the α is set equal to $\alpha_{opt}(\lambda)$, the $\alpha_{opt}$ profile having one of a concave shape with a maximum $\alpha_{opt}$ value or a convex shape with a minimum $\alpha_{opt}$ value, where a is less than or equal to the one of the maximum $\alpha_{opt}$ value or the minimum $\alpha_{opt}$ value.

In yet another embodiment, the present invention is an MMF for operating within a spectral window. The MMF includes a cladding, and a core, the core having a radius a and a refractive index profile, the core comprising at least one dopant, a concentration of the at least one dopant varying between a center or the core and a. The spectral windows is defined by an overlapping range of wavelengths (1) at which the MMF has an EMB equal to or above a predefined minimum with one of a peak EMB or a minimum EMB occurring at wavelength $\lambda_p$ which is less than a maximum wavelength of the spectral window and (2) at which a differential mode delay (DMD) plot of the MMF exhibits a shift to the left of its higher order modes relative to its lower order modes. The DMD plot is measured by launching a plurality of optical pulses into one end of the core at various radial distances r and observing an arrival of the optical pulses at another end of the core at the various radial distances r to determine a velocity of any one of the plurality of optical pulses launched into the core at some radial distance r relative to any other of the plurality of optical pulses launched into the core at some other radial distance r. And the shift to the left is characterized by some of the plurality of optical pulses having a faster velocity relative to at least one other optical pulse having a slower velocity, the at least one other optical pulse having a slower velocity being launched into the core at a lower radial distance r than any of the some of the plurality of optical pulses having a faster velocity.

These and other features, aspects, and advantages of the present invention will become better understood with reference to the following drawings, description, and any claims that may follow.

DETAILED DESCRIPTION

Figure 1:
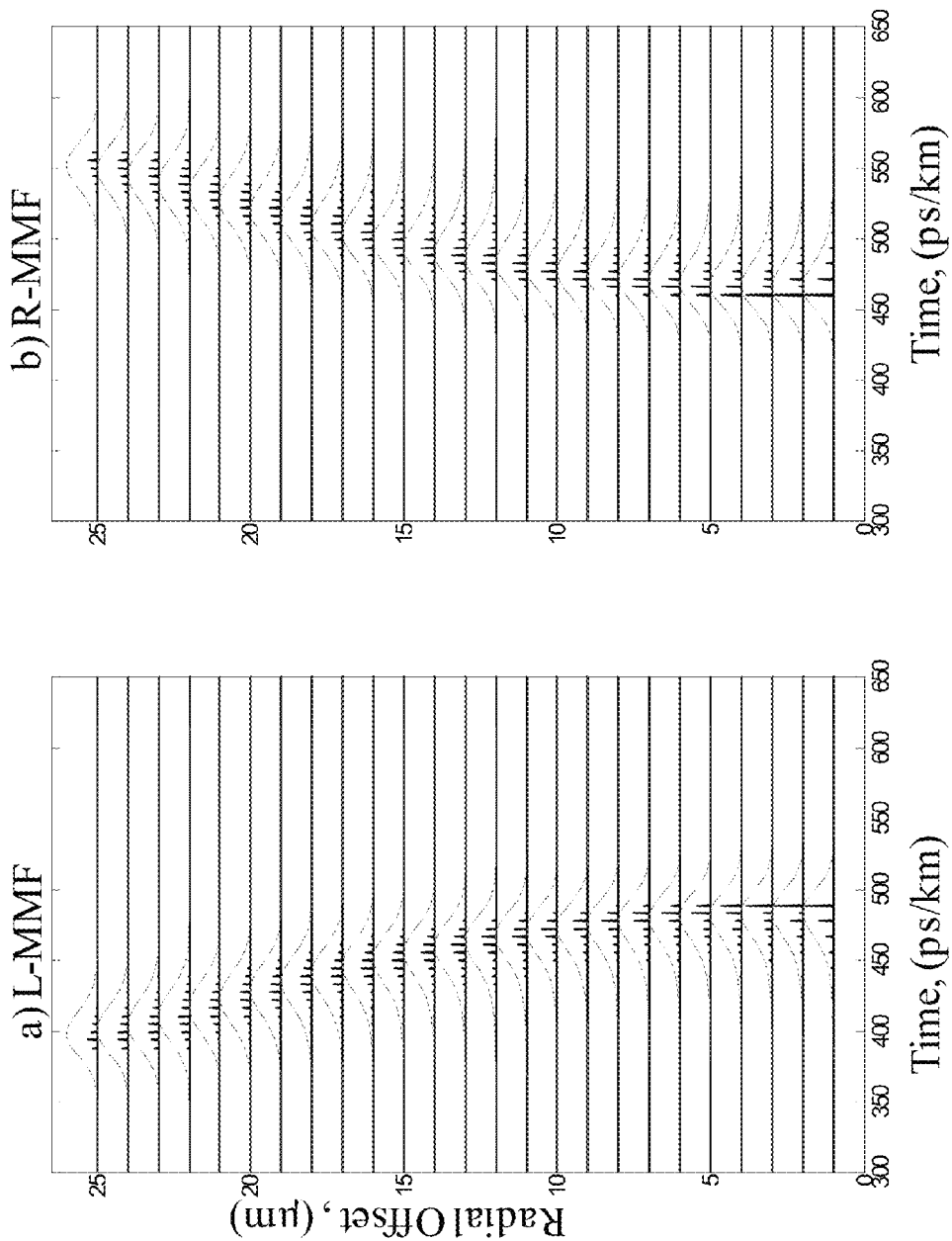
FIG. 1 illustrates DMD radial waveform plots for two fibers with equal radial mode group delays but opposite slope signs.
Figure 2:
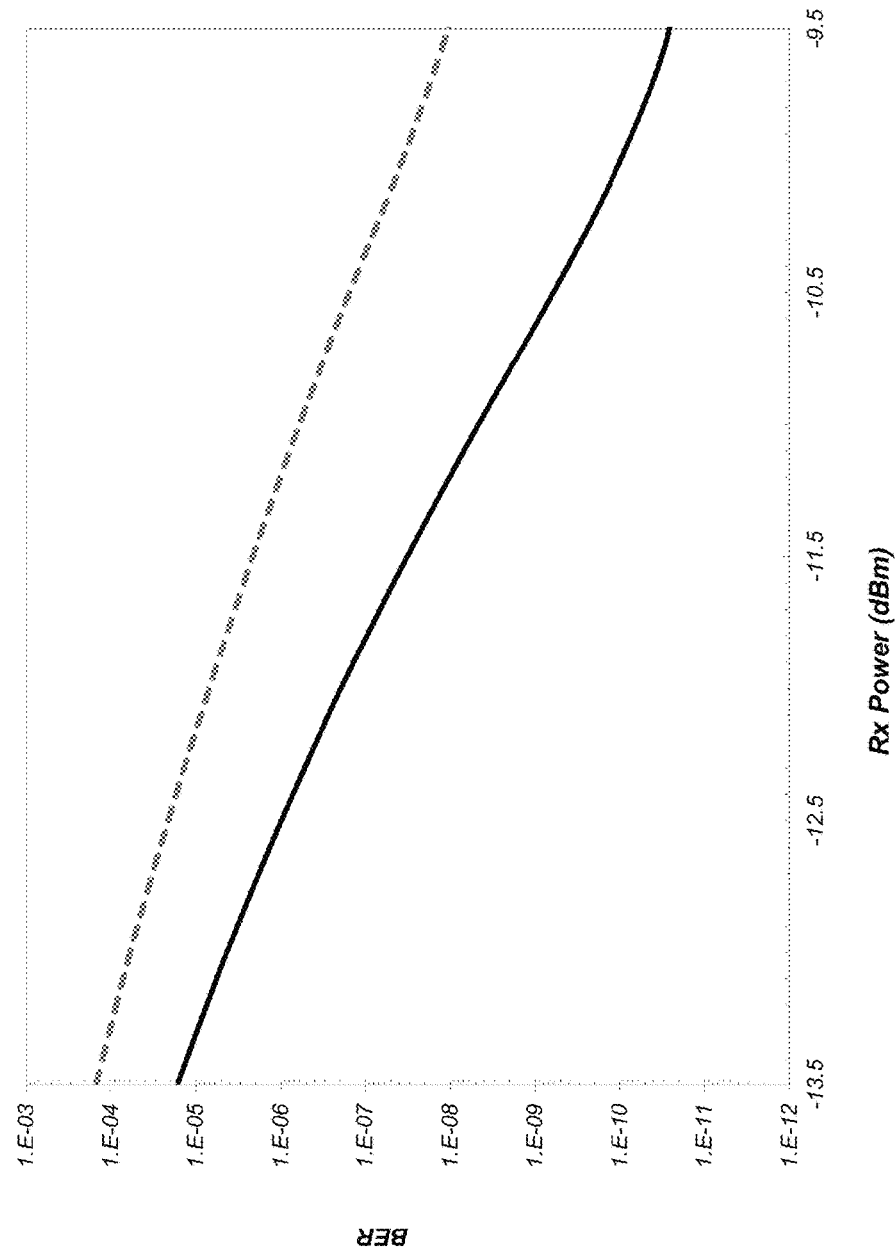
FIG. 2 illustrates an example of the improvements of BER when using L-MMF.
Figure 3:
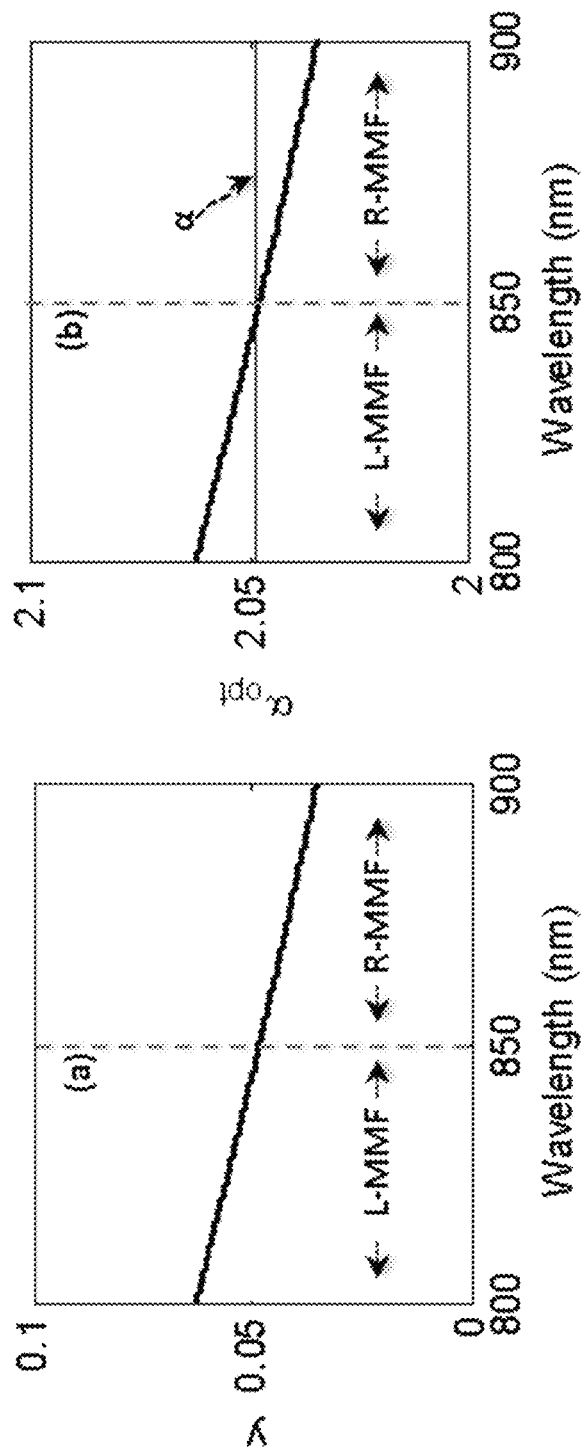
FIG. 3 illustrates graphs of a profile dispersion parameter and $\alpha_{opt}$ for an exemplary MMF with $\lambda_p$=850 nm.
Figure 4:
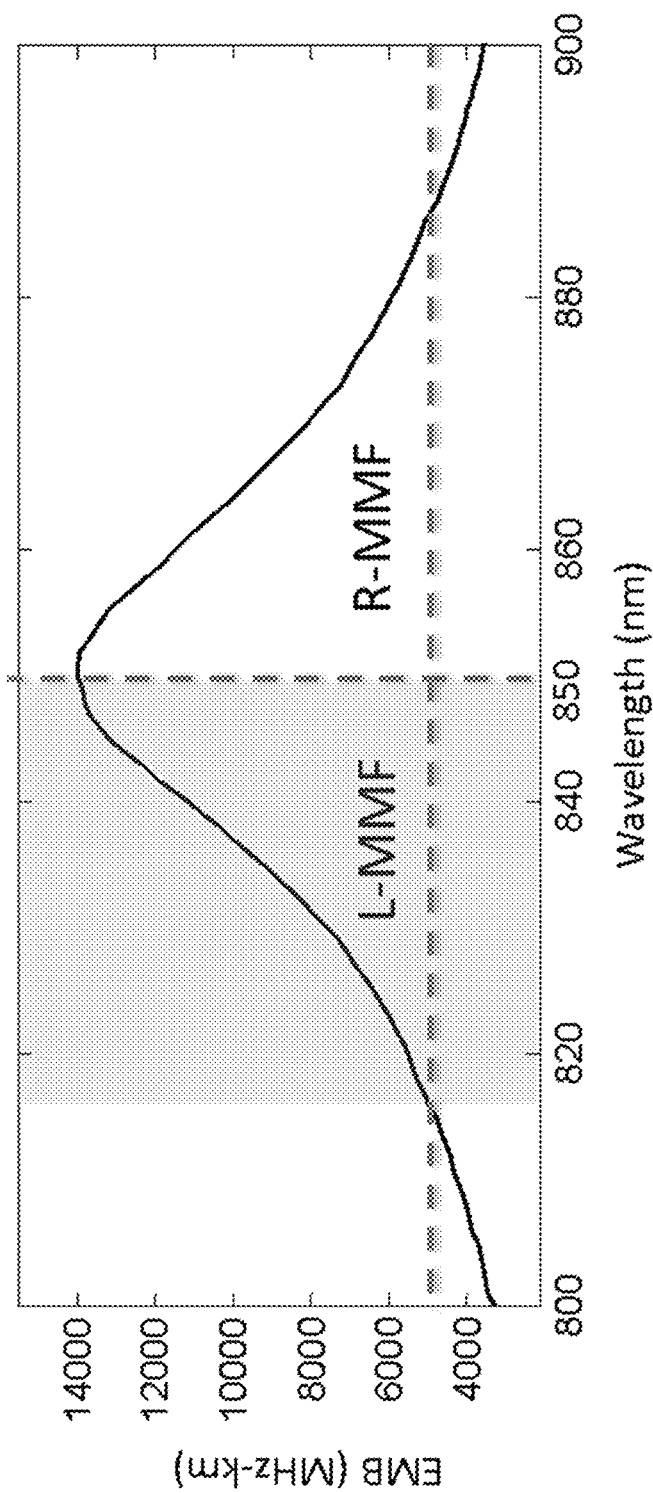
FIG. 4 illustrates an EMB modeled as a function of the wavelength for typical MMF construction with $\lambda_p$=850 nm.
Figure 5:
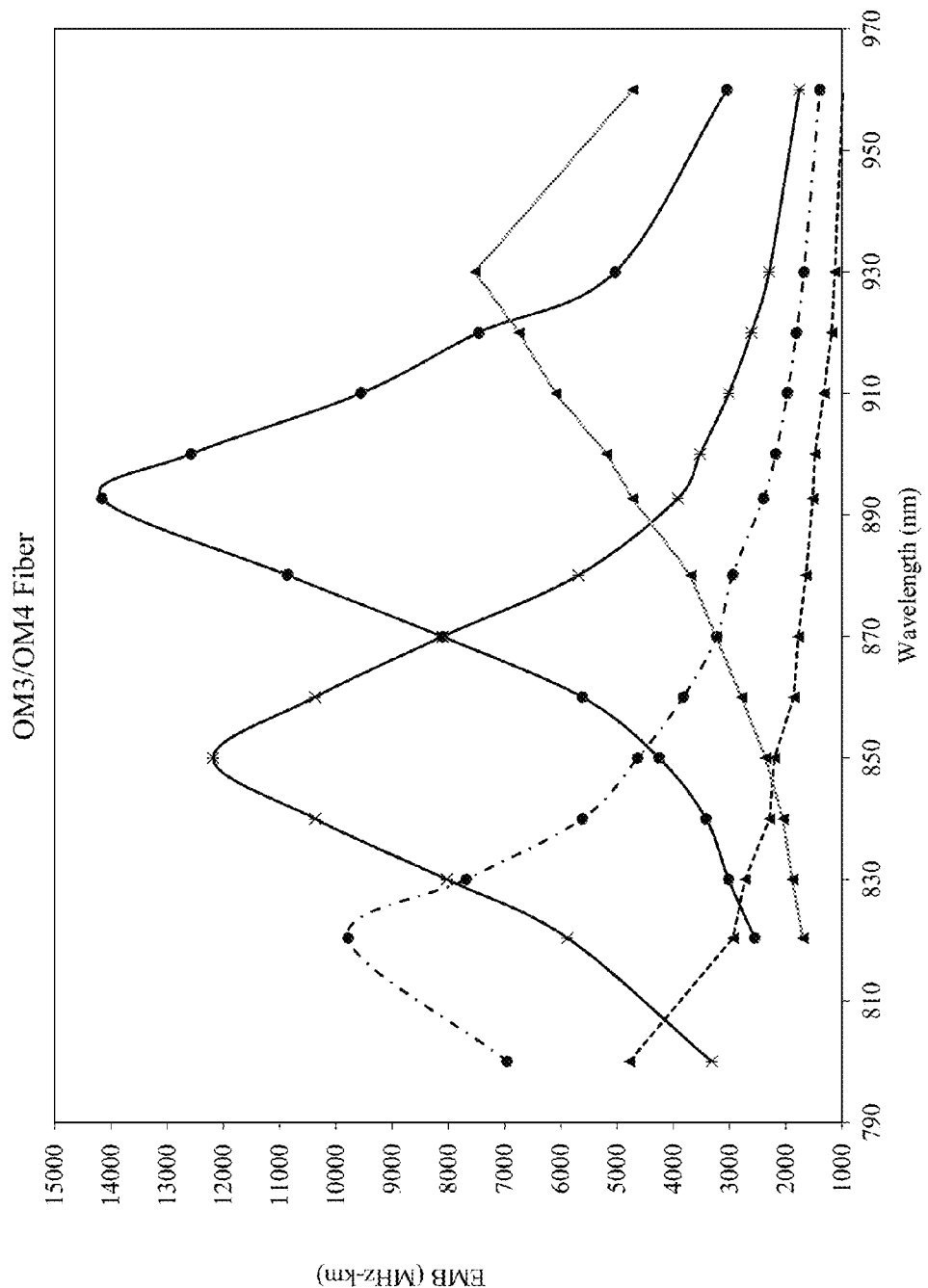
FIG. 5 illustrates the measured EMB as a function of the wavelength for typical MMFs with several values of $\lambda_p$ ranging from 800 nm to 960 nm.
Figure 6A:
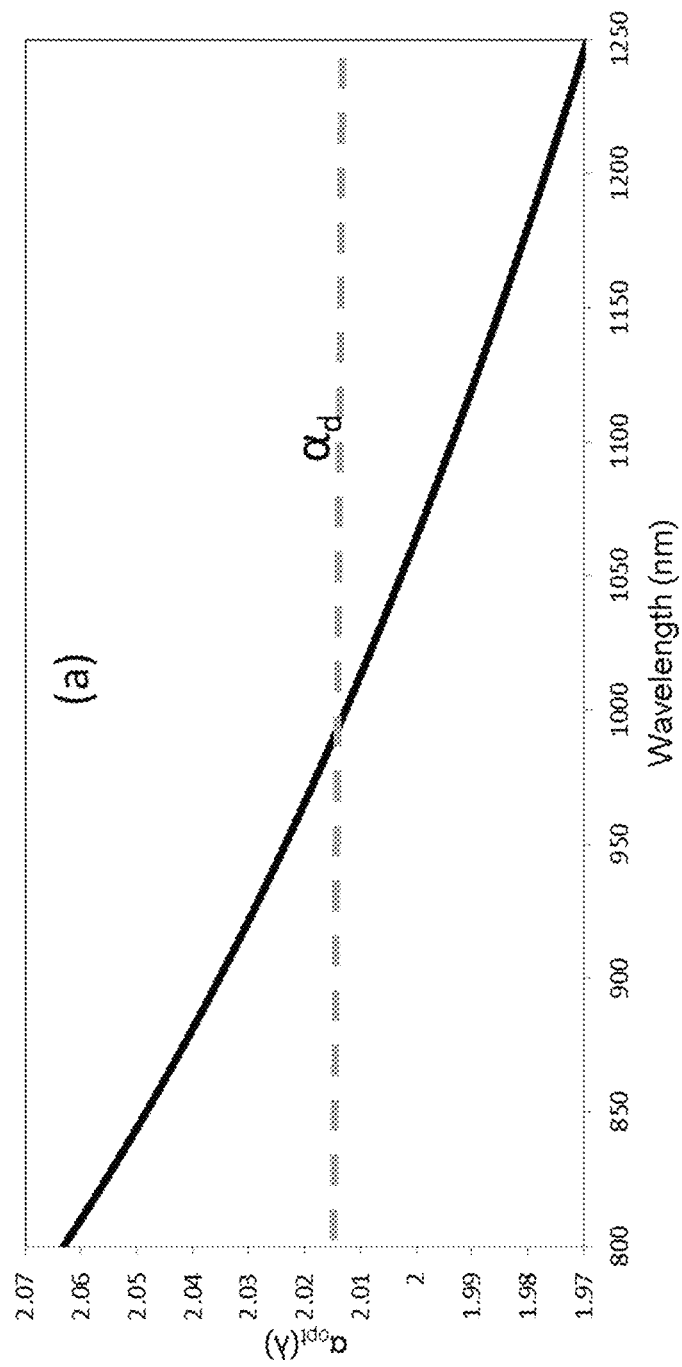
FIG. 6A illustrates an alpha-profile MMF doped with Ge.
Figure 6B:
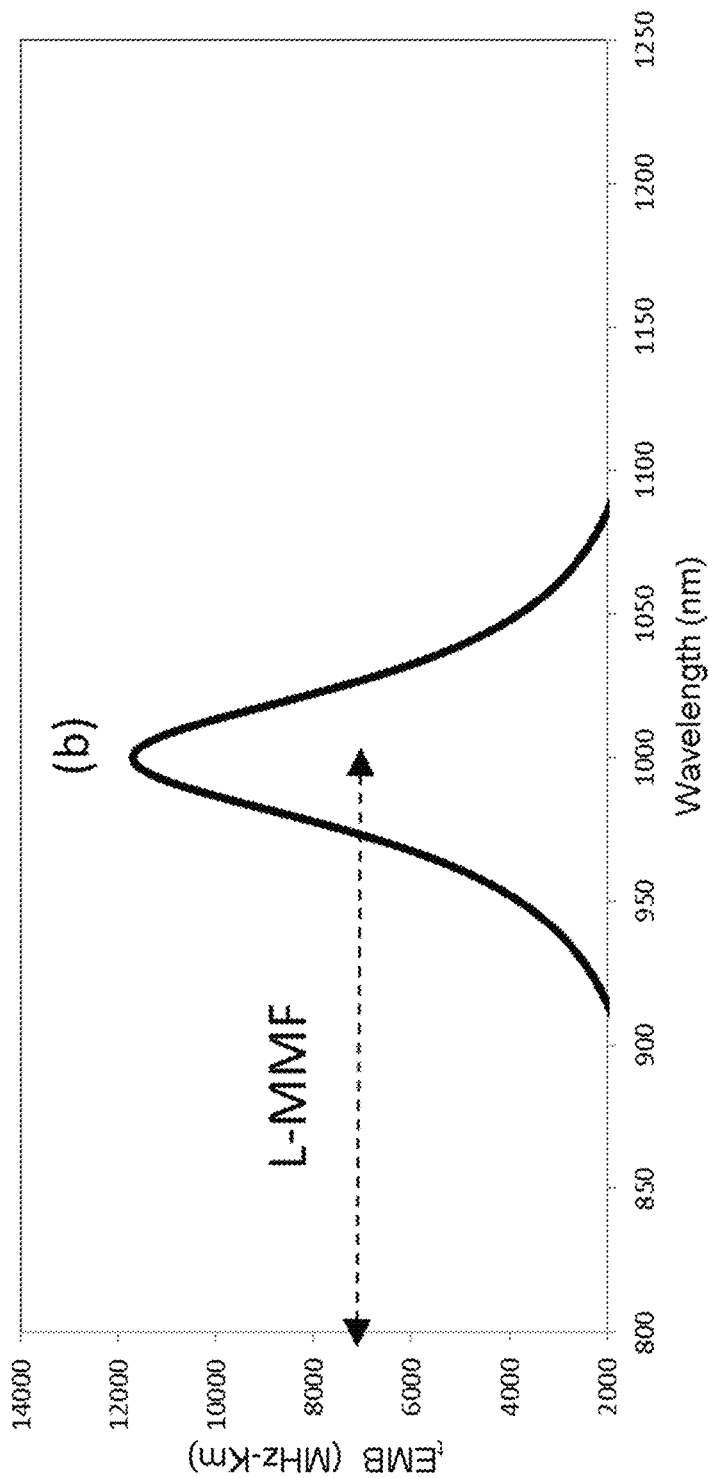
FIG. 6B illustrates the modal bandwidth (EMB) as a function of the wavelength for the MMF of FIG. 6A.
Figure 7:
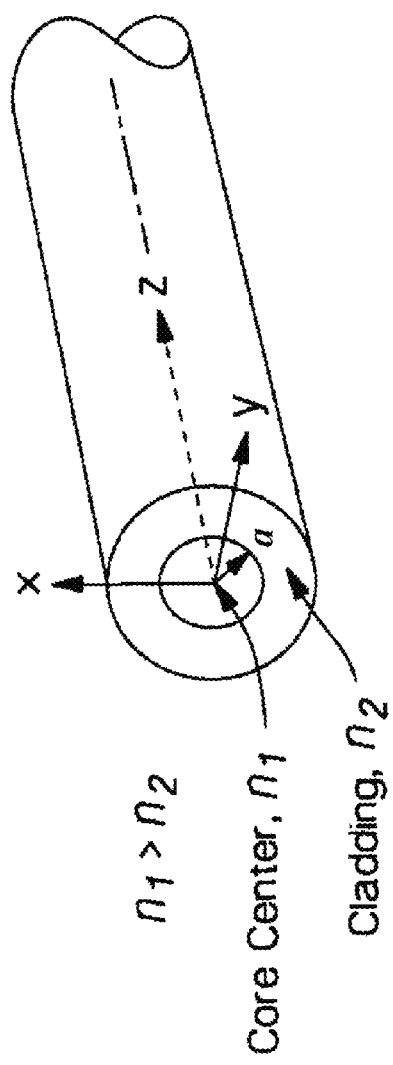
FIG. 7 illustrates a cross sectional perspective view of a core and cladding according to an embodiment of the present invention.

A cross-sectional view of an exemplary multimode optical fiber (MMF) in accordance with the present invention is shown in FIG. 7. This fiber includes a core region having a center and a radius a, and a cladding region surrounding the core. Both the core and the cladding are comprised of optically conductive materials such that the refractive index at the center of the core ($n_1$) is greater than the refractive index of the cladding ($n_2$), and the distribution of the refractive indices throughout the optical fiber is generally referred to as the fiber's refractive index profile.

Figure 8:
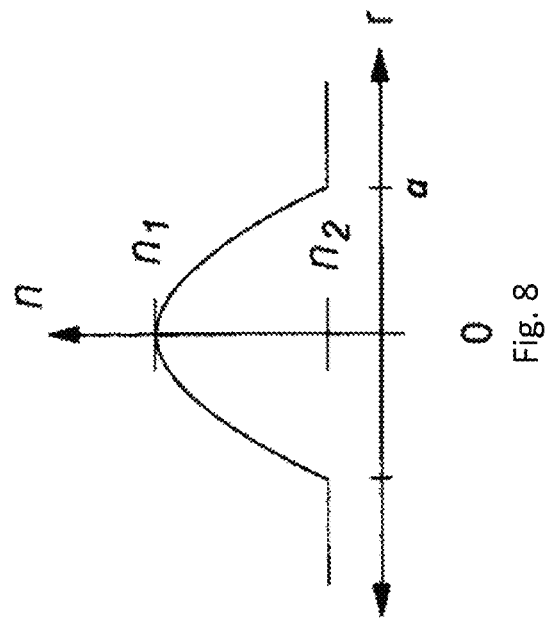
FIG. 8 illustrates a shape of a refractive index profile of a core and cladding according to an embodiment of the present invention.

In an embodiment, the MMF of the present invention includes a dispersion parameter profile having a concave or a convex shape with minimum/maximum value at or near to the wavelength which has the peak EMB or $\lambda_p$. Such an MMF can have a refractive index profile that includes a generally parabolic shape as shown in FIG. 8. This refractive index profile can be attained by including, in the core, one or more dopants in respective concentrations, and it can be defined by equation (1) where the α-value is selected pursuant the fiber's $\alpha_{opt}$ profile. An α-value selected pursuant to the present invention may be referred to as $\alpha_d$ through this specification.

Figure 9A:
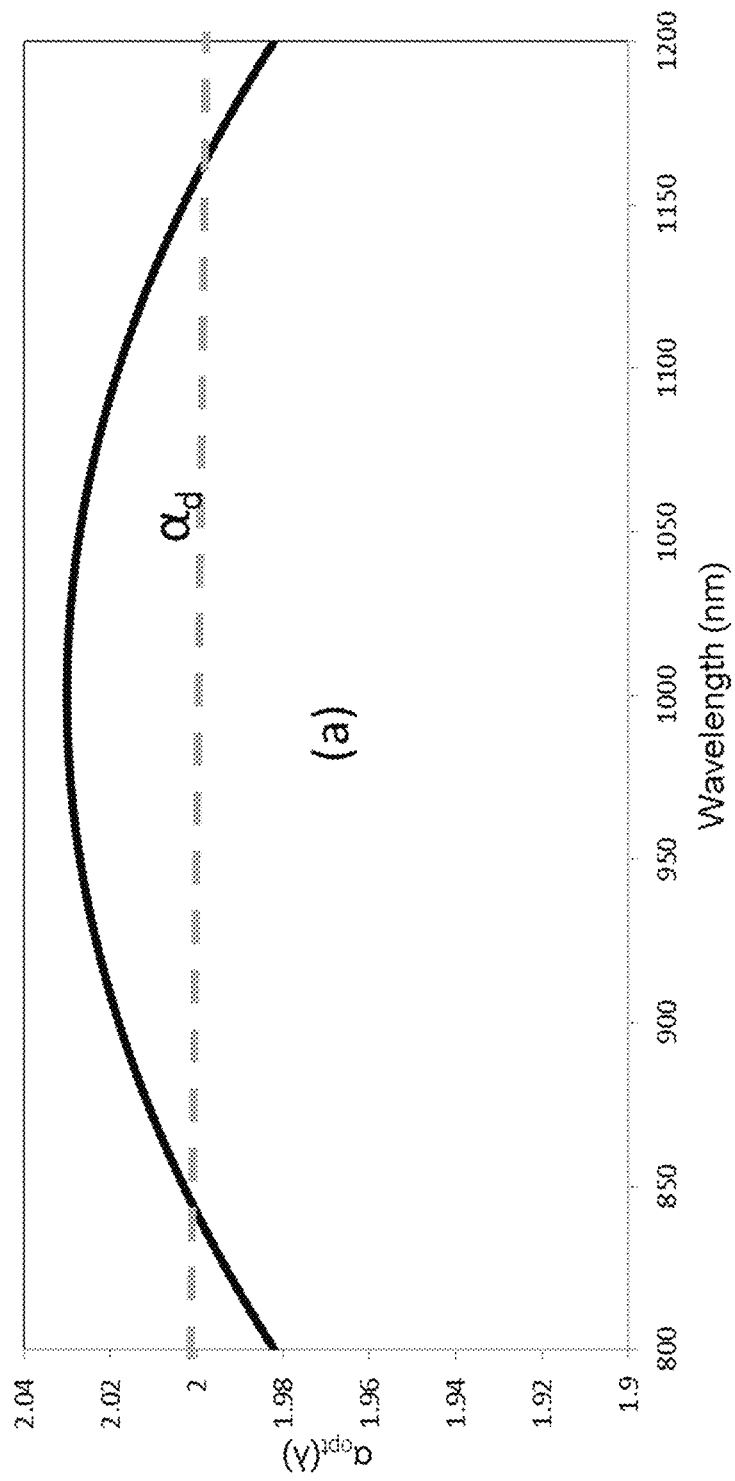
FIG. 9A illustrates an alpha-optimum distribution and an alpha-profile value for an MMF according to an embodiment of the present invention.
Figure 9B:
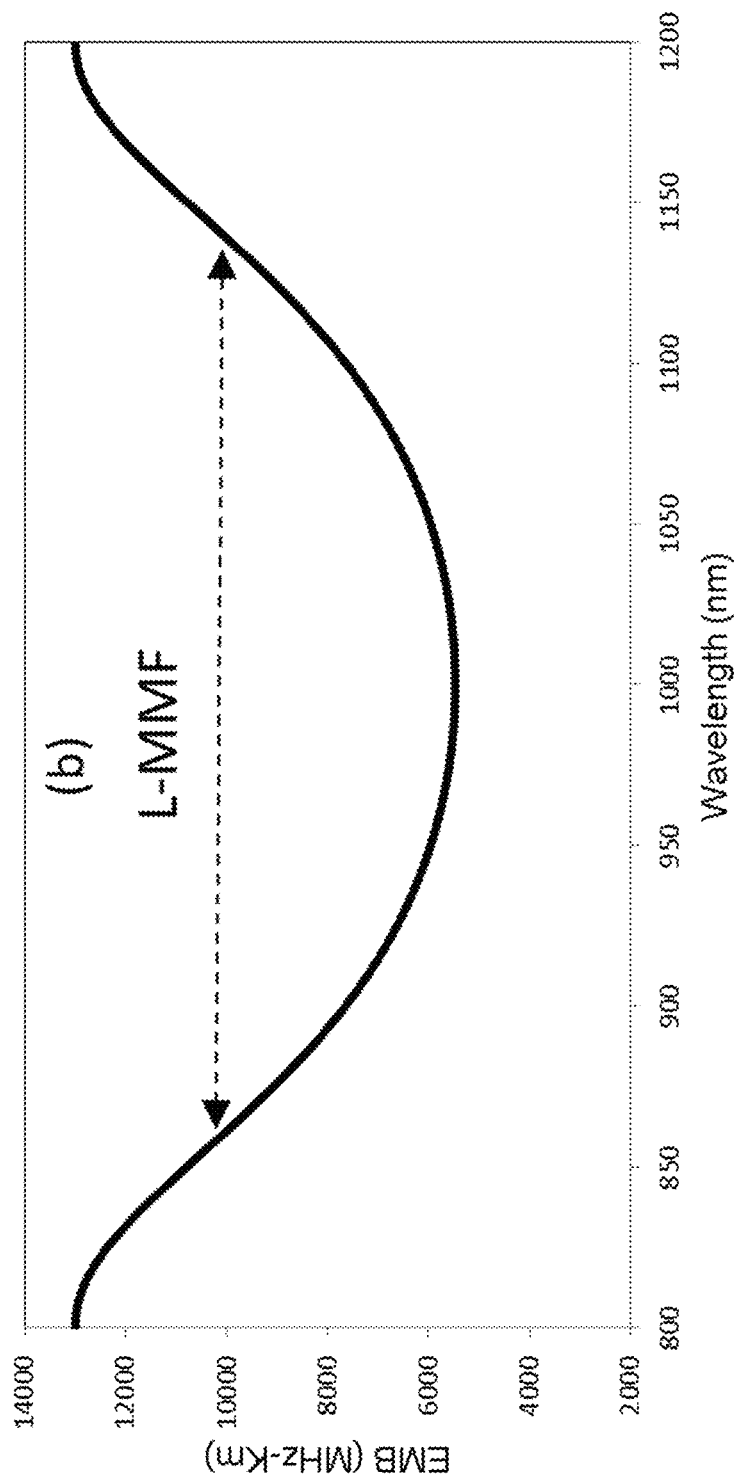
FIG. 9B illustrates the EMB as a function of the wavelength for the fiber of FIG. 9A.

Instances of exemplary characteristics of an MMF provided in accordance with some embodiments of the present invention are shown in FIGS. 9A-10B. FIGS. 9A and 9B illustrate exemplary characteristics of an MMF that uses dopants such as, for example, Boron (B) to decrease the refractive index of the core and/or cladding and Fluorine (F) to decrease the refractive index of the cladding. Certain combination of concentrations of these dopants in the core and cladding can produce concave like functions for the alpha optimum profile as shown by the solid line in FIG. 9A. By designing the fiber to have a refractive index profile with a power exponent of $\alpha_d < \alpha_{opt}$, it is possible to maintain negative relative group delays over a broad spectral region while maintaining a high modal bandwidth as illustrated in FIG. 9B.

Figure 10A:
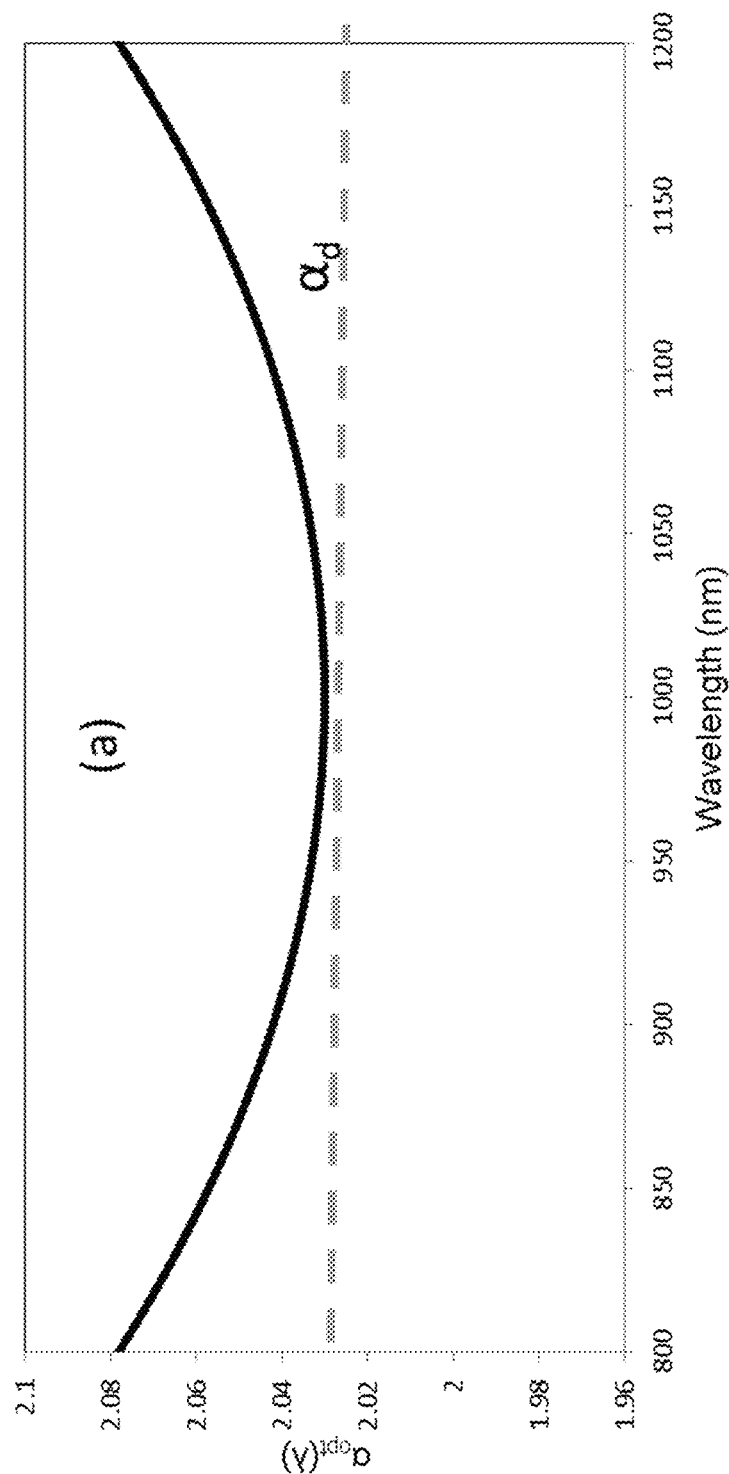
FIG. 10A illustrates an alpha-optimum distribution and an alpha-profile value for an MMF according to an embodiment of the present invention.
Figure 10B:
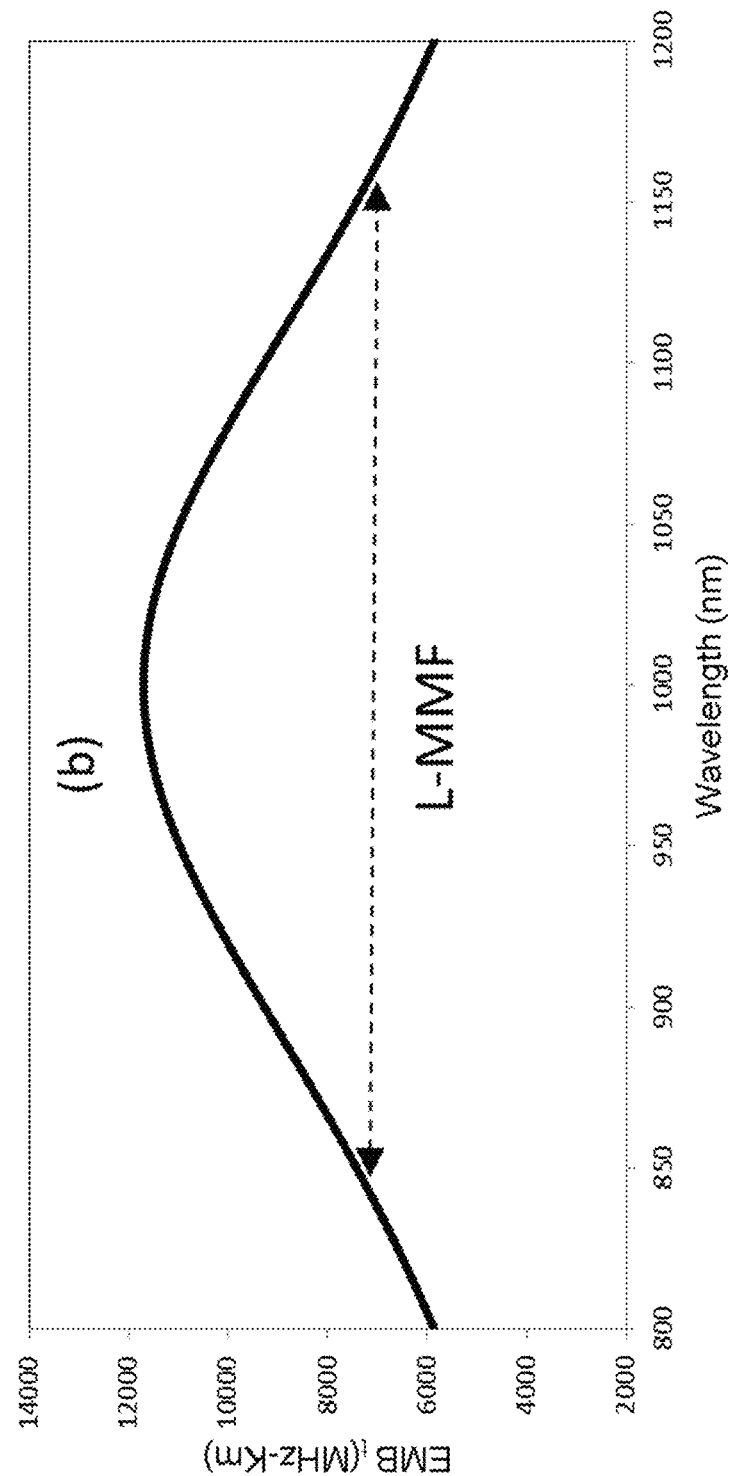
FIG. 10B illustrates the EMB as a function of the wavelength for the fiber of FIG. 10A.

FIGS. 10A and 10B illustrate exemplary characteristics of another MMF that is doped with, for example, phosphorous (P) to increase the refractive index of the cladding. Small amounts of phosphorous, or other dopants, in the core in combination with dopant(s) such as fluorine in the cladding can produce convex like functions for the alpha optimum profile as shown in FIG. 10A. By designing the fiber to have a refractive index profile with a power exponent of $\alpha_d < \alpha_{opt}$, it is possible to maintain negative relative group delays in a broad spectral region while maintaining a high modal bandwidth as illustrate in FIG. 10B.

Figure 11:
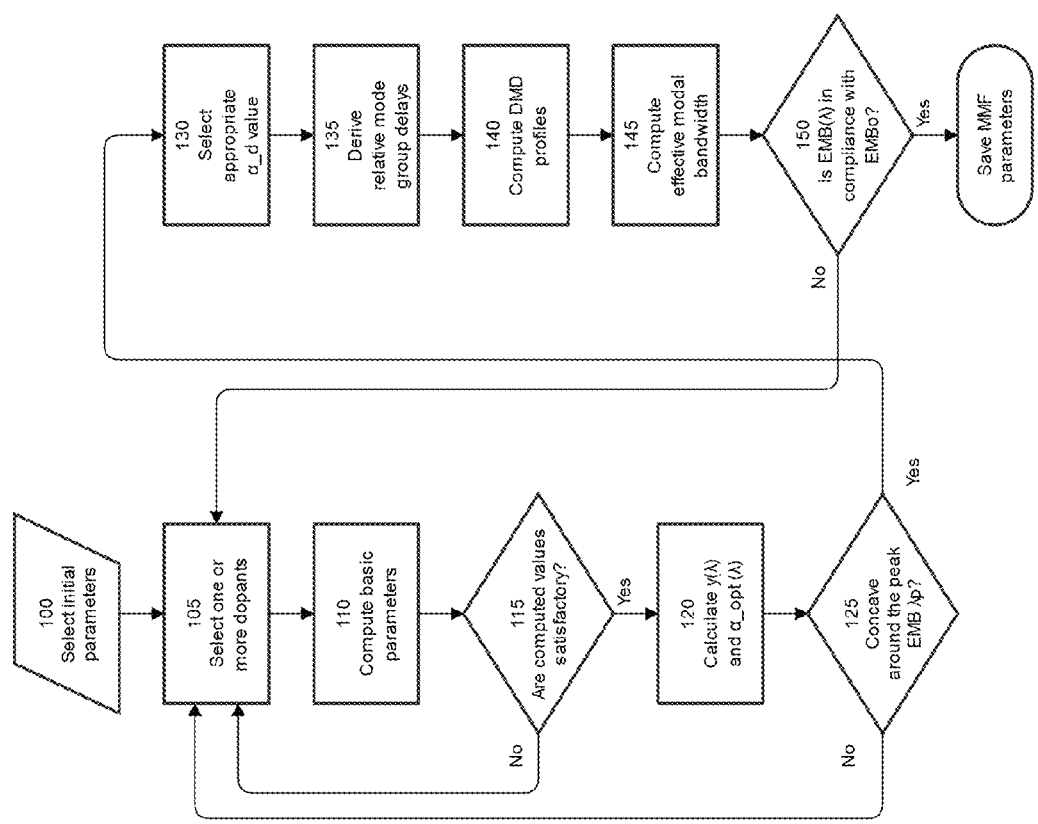
FIG. 11 illustrates a flow chart representative of a method according to an embodiment of the present invention.

FIG. 11 illustrates a flow chart outlining the process for determining $\alpha_d$ and developing an MMF profile according to an embodiment of the present invention. This embodiment can be used in a design and/or manufacturing process for an MMF with one or more dopants, where the concentration profile of each dopant is based on the same $\alpha_d$ value. It is to be understood that the same $\alpha_d$ value does not require the same dopant concentration value. In step 100, the initial parameters are selected for the MMF. These parameters can include, but are not limited to, numerical aperture, index contrast Δ, core and cladding dimensions, peak EMB, maximum coupling loss, chromatic dispersion parameters (e.g., chromatic dispersion coefficient D, zero dispersion wavelength $\lambda_z$), manufacturing tolerances, and/or desired spectral windows for a minimum value of the effective modal bandwidth $EMB_0$. Once the initial parameters are provided, one or more dopants together with their respective concentrations are selected in step 105. The selection in step 105 may be based on some pre-existing criteria, such as, for example, a library of dopants compatible for the fabrication of $SiO_2$ fiber core and cladding. A very brief example of such a library is provided in Table III. The range of combinations among these and other dopants is very extensive, and can be computed numerically from the Sellmeier coefficients.

TABLE III

| Sample | Doping element & concentration | Sellmeier coefficients $a_i$ | Sellmeier coefficients $b_i$ |
| --- | --- | --- | --- |
| 1 | Cl (~0.06 wt %) | 0.50716 | 0.04014 |
| | | 0.59707 | 0.11359 |
| | | 0.69879 | 8.81674 |
| 2 | Cl (0.3 wt %) | 0.88671 | 0.07954 |
| | | 0.21675 | 0.1244 |
| | | 0.69401 | 8.83315 |
| 3 | F (0.9 wt %) | 0.87219 | 0.07417 |
| | Cl (0.13 wt %) | 0.21238 | 0.1298 |
| | | 0.94959 | 10.22611 |
| 4 | P (12.5 wt %) | 0.51512 | 0.02636 |
| | Cl (~0.03 wt %) | 0.62804 | 0.11614 |
| | | 1.0743 | 10.6931 |
| 5 | B2O3 (13.3 mol %) | 0.690618 | 0.0619 |
| | | 0.401996 | 0.123662 |
| | | 0.898817 | 9.09896 |
| 6 | P2O5 (9.1 mol %) | 0.69579 | 0.061568 |
| | | 0.452497 | 0.119921 |
| | | 0.712513 | 8.656641 |

Alternatively, the selection in step 105 may be random. Upon the selection of the dopant(s) and respective concentration(s), an initial verification step 110 is performed where the basic characteristics such as, but not limited to, numerical aperture, Δ, D, and $\lambda_z$ are computed. The initial verification can allow for a relatively early determination of whether the selected material(s) will result in an MMF that falls within some desired guidelines. This can be especially useful in determining whether the MMF will satisfy certain standards characteristics such as those defined by the OM3 and OM4 standards. This determination can be made in step 115 where if it is determined that the MMF will not satisfy some predetermined criteria, a new selection of a dopant(s) and concentration(s) must be made in step 105. While this verification and comparison process embodied in the two steps 110 and 115 is performed immediately after the dopant selection step of 105, this is not a requirement. Instead it may be performed during any time following step 105. However, for practical purposes, early determination of a non-compatible selection in step 105 may provide time, computing, and/or cost savings.

If at step 115 it is determined that the selected material(s) and respective concentration(s) are satisfactory, in step 120 the profile of the dispersion parameter y(λ) and the optimum α-value $\alpha_{opt}(\Delta)$ are calculated using equations (3) and (4), and in step 125 the concavity of the dispersion parameter y(λ) around the peak EMB $\lambda_p$ is evaluated. Note that the term "concavity" as used herein refers to both a concave and a convex shape. If the profile of the dispersion parameter is not concave or convex around the peak EMB, steps 105-125 are repeated with a new dopant(s) and/or concentration(s). If, on the other hand, the profile of the dispersion parameter does exhibit desired concavity around the peak EMB value, the method proceeds to step 130 where an $\alpha_d$ value is chosen based on the optimum α-value at peak EMB $\alpha_{opt}(\lambda_p)$ and the manufacturing tolerances. In an embodiment, $\alpha_d$ follows the following equation:

$$\alpha_d = \alpha_{opt}(\lambda_p) + b \cdot \text{abs}(T_\alpha)/2 \qquad (6)$$

where $T_\alpha$ is a manufacturing tolerance for the α-parameter which depends on manufacturer (e.g., ±0.01) and parameter b is utilized to increase the broadband windows for high EMB, relax the conditions for relative negative mode group delay tilt, to include the small dependence of alpha with wavelength, or to adjust for the different process used by fiber manufacturers. In order to produce an MMF which exhibits the L-MMF condition, the sign of b must be negative.

In some cases, for example multicomponent fiber, it may not be possible to find relatively simple analytical expressions such as equations (6). In those cases, use of a full numerical model to find the optimum $\alpha_d$ value for each component may be required.

After determining the $\alpha_d$ value, the relative mode group delays $t_g(\lambda)$ are derived in step 135 by using equation (2) and substituting $\alpha_d$ in place of α; the differential mode delay (DMD) profiles are computed in step 140 from the earlier-derived mode group delays $t_g(\lambda)$; and the effective modal bandwidth EMB(λ) is computed in step 145 from the earlier computed DMD profiles. Thereafter, a final verification of performance compliance is made in step 150 where the values obtained in steps 135-145 are evaluated. In one example, the evaluation in step 150 can be limited to the evaluation of the EMB(λ) to verify that it is in compliance with the minimum required value $EMB_0$ for the spectral window originally defined in step 100. In other examples, the values derived in steps 135 and 140 can also be evaluated. For instance, the maximum values for the relative mode group delays are checked to fall within some predetermined range group (e.g., a range specified by the OM3 or OM4 standard). Furthermore, the sign (e.g., positive versus negative) of the relative mode group delay values can also be evaluated to confirm the presence of an L-MMF condition for at least some of the operating wavelengths. In another instance, the DMD plots can be evaluated for visual confirmation of fiber's transmission characteristics (e.g., the presence of a left shift of the majority of peak pulse at increasing radial offsets at various wavelengths). Moreover, the plots can be used to measure the DMD value at various operating wavelengths which in it of itself can be a prerequisite to meeting some preexisting standard. Note that the recitation of verification processes is not meant to be limiting and/or exhaustive. If the verification process returns a favorable result, the MMF parameters are saved in step 155 for later use such as, for example, the manufacture of the MMF. If, on the other hand, the verification step 150 fails, steps 105-145 are repeated for new dopant(s) and/or concentration(s).

As an example, the method described in FIG. 11 may be used to produce a broadband MMF that uses $B_2O_3$ and small amounts of $GeO_2$. The addition of $B_2O_3$ dopant to the fiber's core has the effect of reducing the refractive index and therefore reducing the λ, increasing phase velocity and group velocity relative to pure Si, and varying the shape of the dispersion parameter y(λ) and $\alpha_{opt}$.

Figure 12:
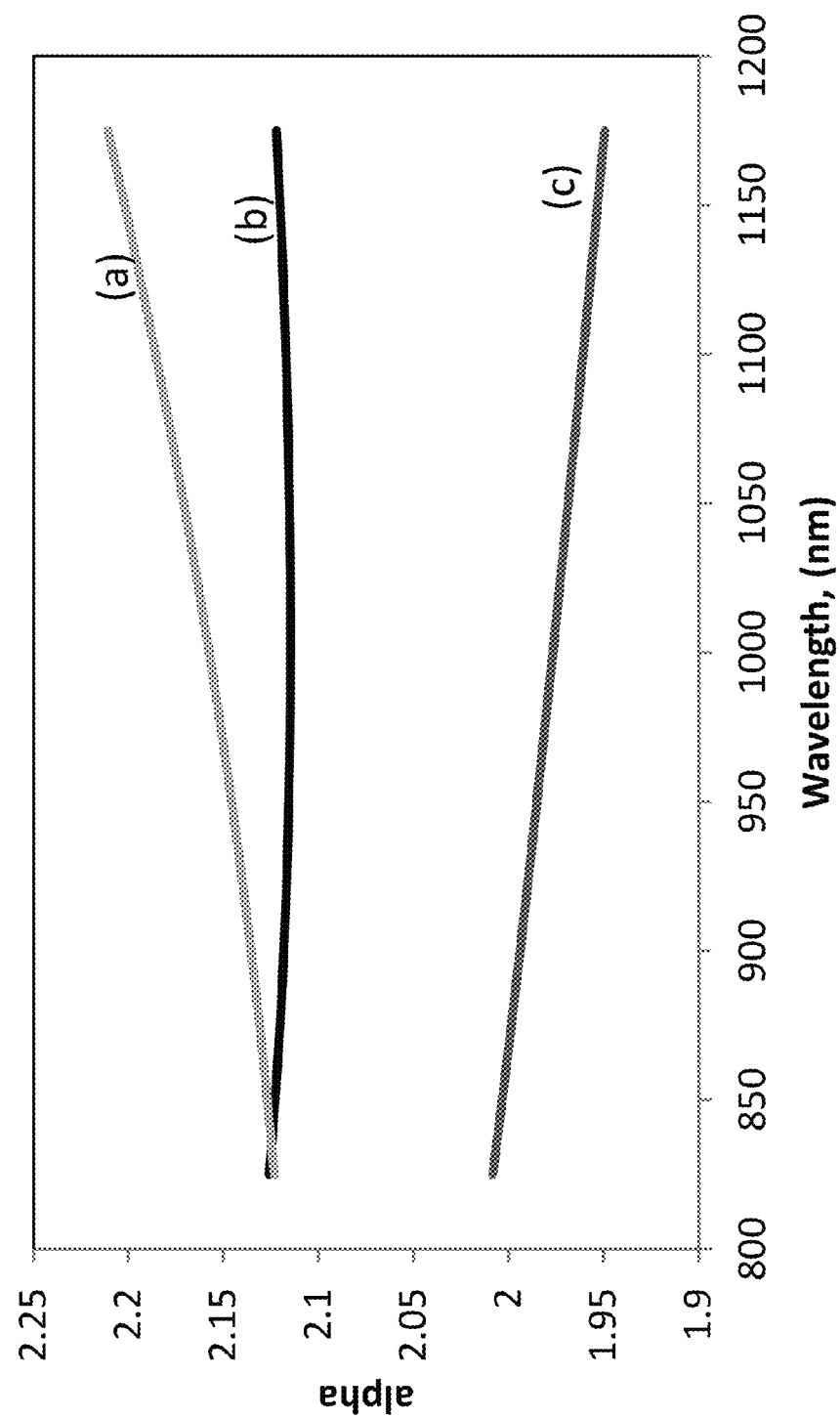
FIG. 12 illustrates $\alpha_{opt}$ values for three exemplary dopant concentrations.

In order to maintain Δ≈1% at an operating wavelength of about 850 nm to reduce coupling losses when mated with legacy fibers, modeling results indicate that Fluorine doping in the cladding and/or combined doping of $GeO_2$—$B_2O_3$ in the core may be desired. The effect of $B_2O_3$ on $\alpha_{opt}$ is shown in FIG. 12 where the wavelength-dependent $\alpha_{opt}$ profiles are modeled for three dopant concentrations. The (a) $\alpha_{opt}$ profile is based on a concentration of 13.3 mol % of $B_2O_3$; the (b) $\alpha_{opt}$ profile is based on a concentration of 4.1 mol % of $GeO_2$ and 7.7 mol % of $B_2O_3$; and the (c) $\alpha_{opt}$ profile is based on a concentration of 0.1 mol % of $GeO_2$ and 5.5 mol % of $B_2O_3$.

To produce a broadband MMF with high modal bandwidth and negative group delays the required concentration of dopants should be precisely controlled. This may allow the negative group delay condition to be maintained for at least 200 nm for EMB>4.7 GHz·km, and over 300 nm for OM3 fibers.

Figure 13:
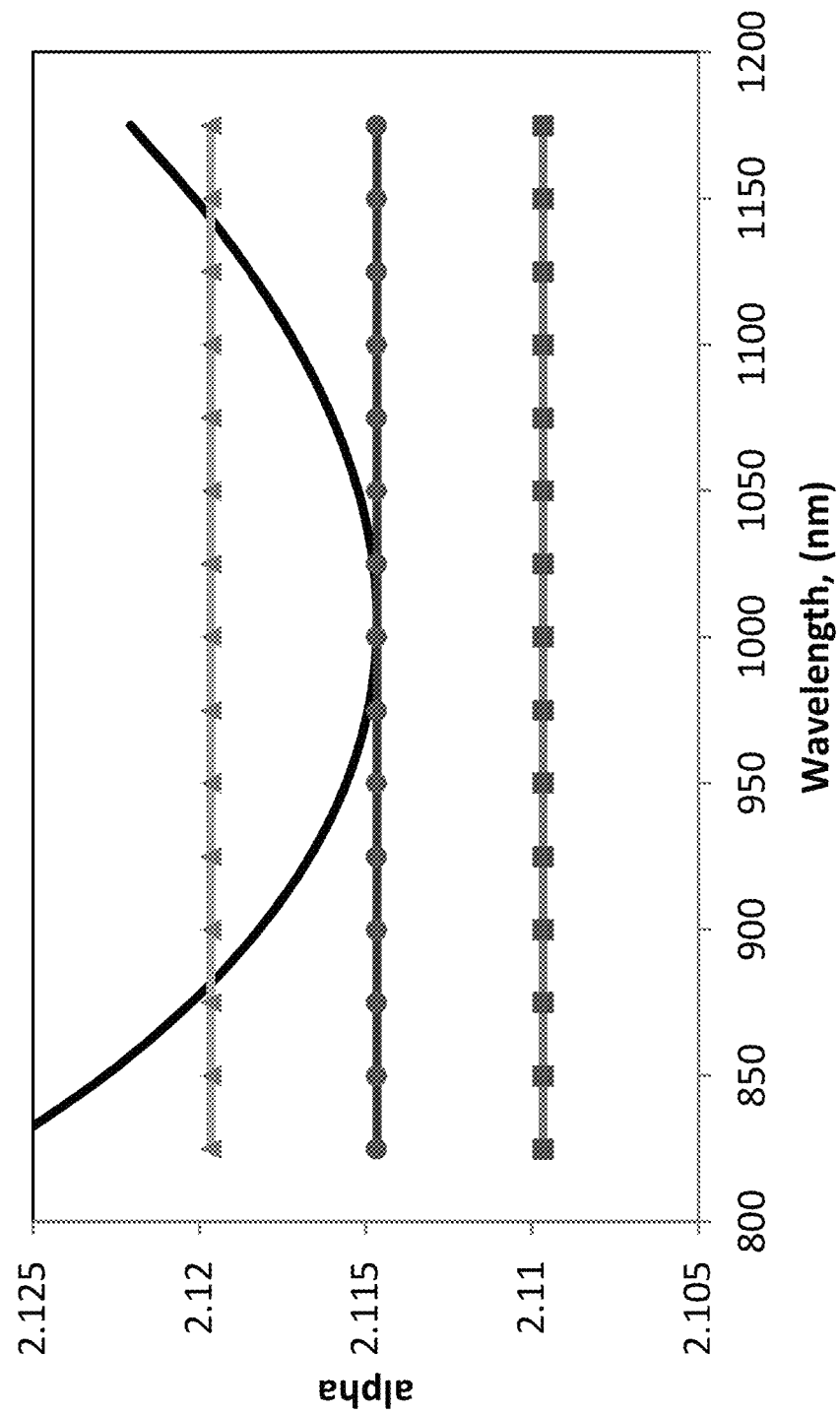
FIG. 13 illustrates an $\alpha_{opt}$ profile for a fiber according to an embodiment of the present invention.

In an embodiment, the fibers that satisfy the requirements for high EMB and negative group delays can have a core with $GeO_2$ dopant concentration between 3 to 6 mol % and $B_2O_3$ dopant concentration between 4 and 9 mol %. For such fiber the cladding includes a less than 4 wt % dopant concentration of $B_2O_3$ and/or F. For example of the $\alpha_{opt}$ value of an MMF co-doped with 4.1 mol % Ge and 7.7 mol % $B_2O_3$ in the core, and 3 wt % F in the cladding is shown in FIG. 13 as the parabolically shaped solid line. The ideal designed alpha ($\alpha_d$) for the profile shape is 2.1147 and is equivalent to the α value at the vertex of the parabolic plot. For this example, it is assumed that tolerances of ±0.005 in the $\alpha_d$ value (with respect to the ideal $\alpha_d$ value) are permissible in order to remain within the desired EMB limits.

Figure 14:
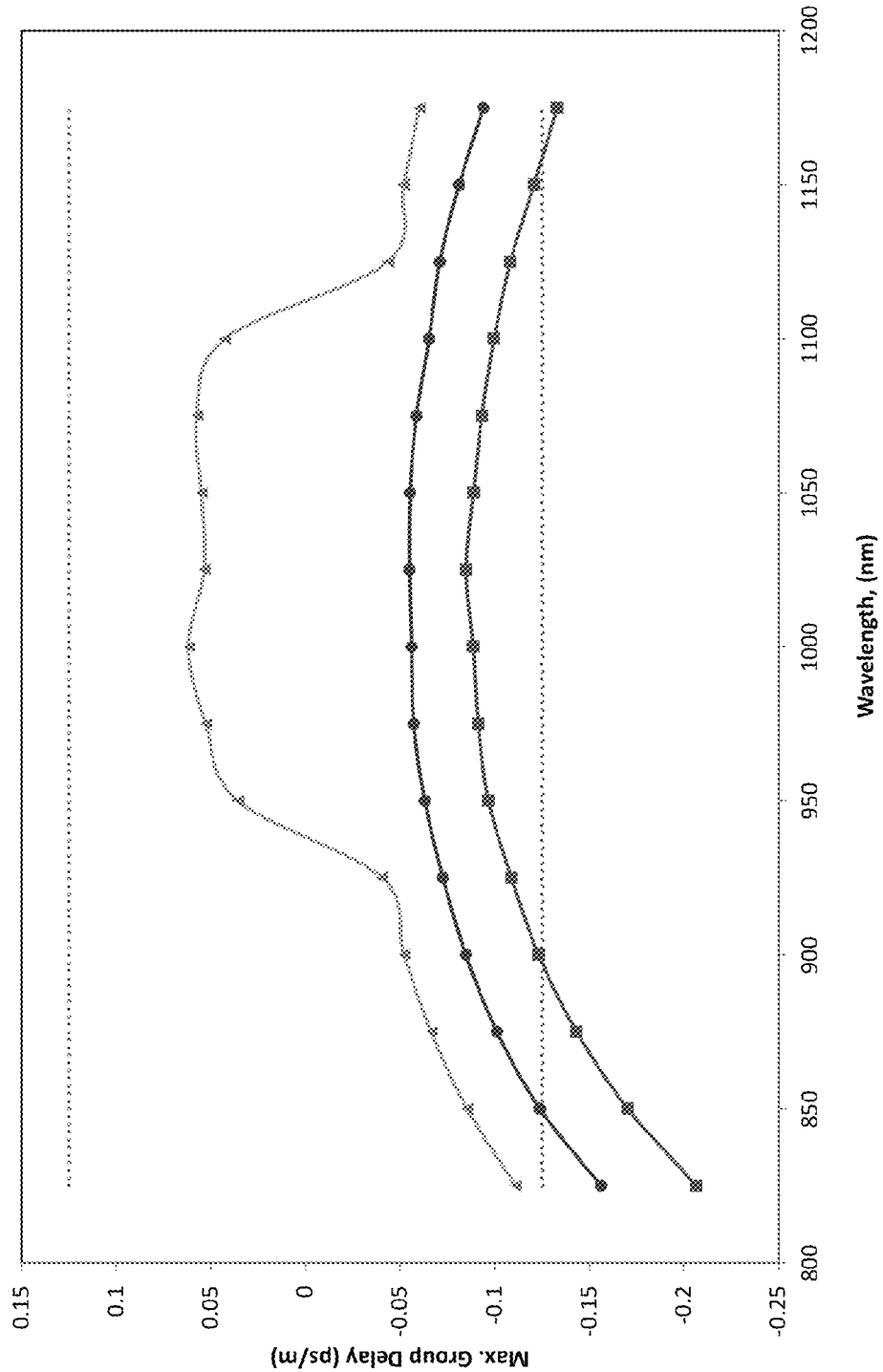
FIG. 14 illustrates maximum relative group delays for the fiber of FIG. 13.

Given the potential $\alpha_d$ values shown in FIG. 13, it is possible to derive the maximum values for the relative mode group delays using equation (2). These results are provided in FIG. 14 where the maximum relative group delays are plotted as a function of wavelength for the three separate target $\alpha_d$ values ($\alpha_d$=2.1197 for triangle markers; $\alpha_d$=2.1147 for dot markers; and $\alpha_d$=2.1097 for square markers). The dotted horizontal lines represent the range limits of maximum delays for EMB>4.7 GHz·km. Based on these results it is possible to tell that all three instances remain within the maximum delay limits over a relatively broad range of wavelengths. Furthermore, it is possible to tell that for MMFs having $\alpha_d$=2.1147 or 2.1097, the maximum relative mode group delays within the region of interest have a negative value. This provides an indication of an L-MMF condition occurring throughout the range of interest for the respective fibers. On the other hand, for an MMF having $\alpha_d$=2.1197, at least some maximum relative group delays will have a positive value. While this may not be desirable in some cases, in other cases the positive values may form a part of an overall analysis of the performance resulting from a fiber with a certain $\alpha_d$ value. In other words the existence of positive $\alpha_d$ values does not necessarily take the resulting fiber or the process by which that fiber was made outside the scope of the present invention. This, as further described later in the specification, is because at higher wavelengths, MCDC may not be of such high concern. As such, a fiber which meets the L-MMF condition over only a part of its operational wavelength window may still be desirable. The results provided in FIG. 14 highlight the potential need for selecting an appropriate $\alpha_d$ value so as to remain within appropriate operational limits considering potential manufacturing tolerances.

Figure 15:
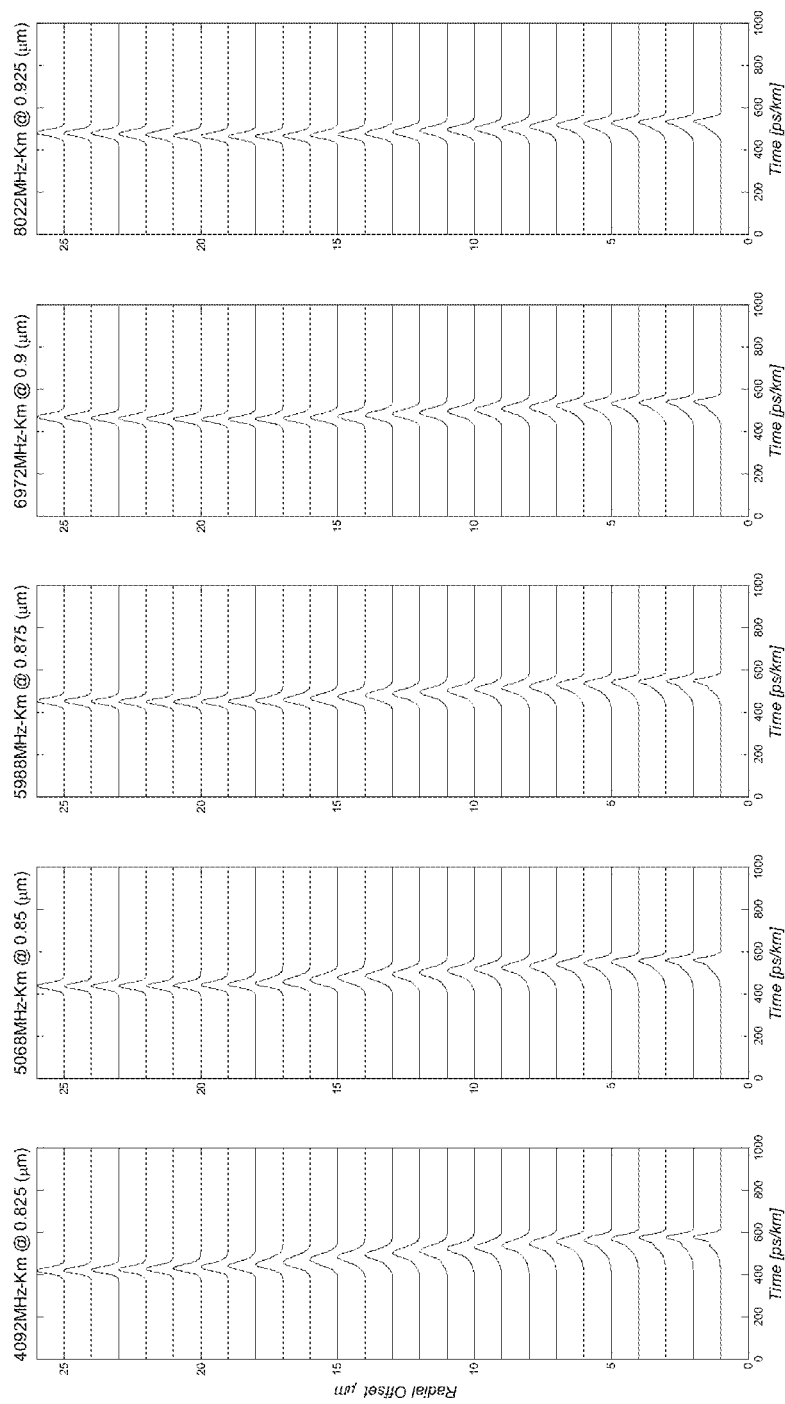
FIGS. 15-17 illustrate DMD plots for the fiber of FIG. 13.
Figure 16:
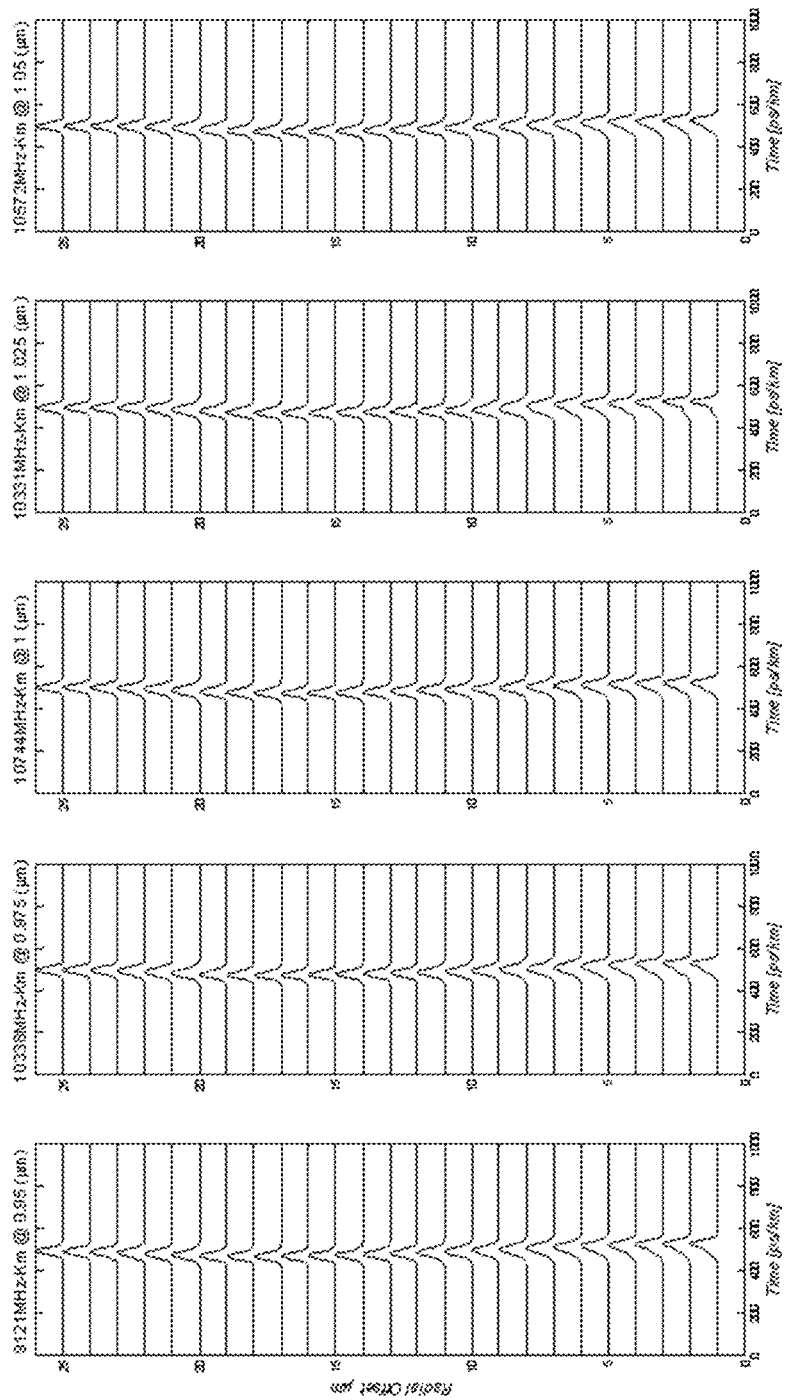
Figure 17:
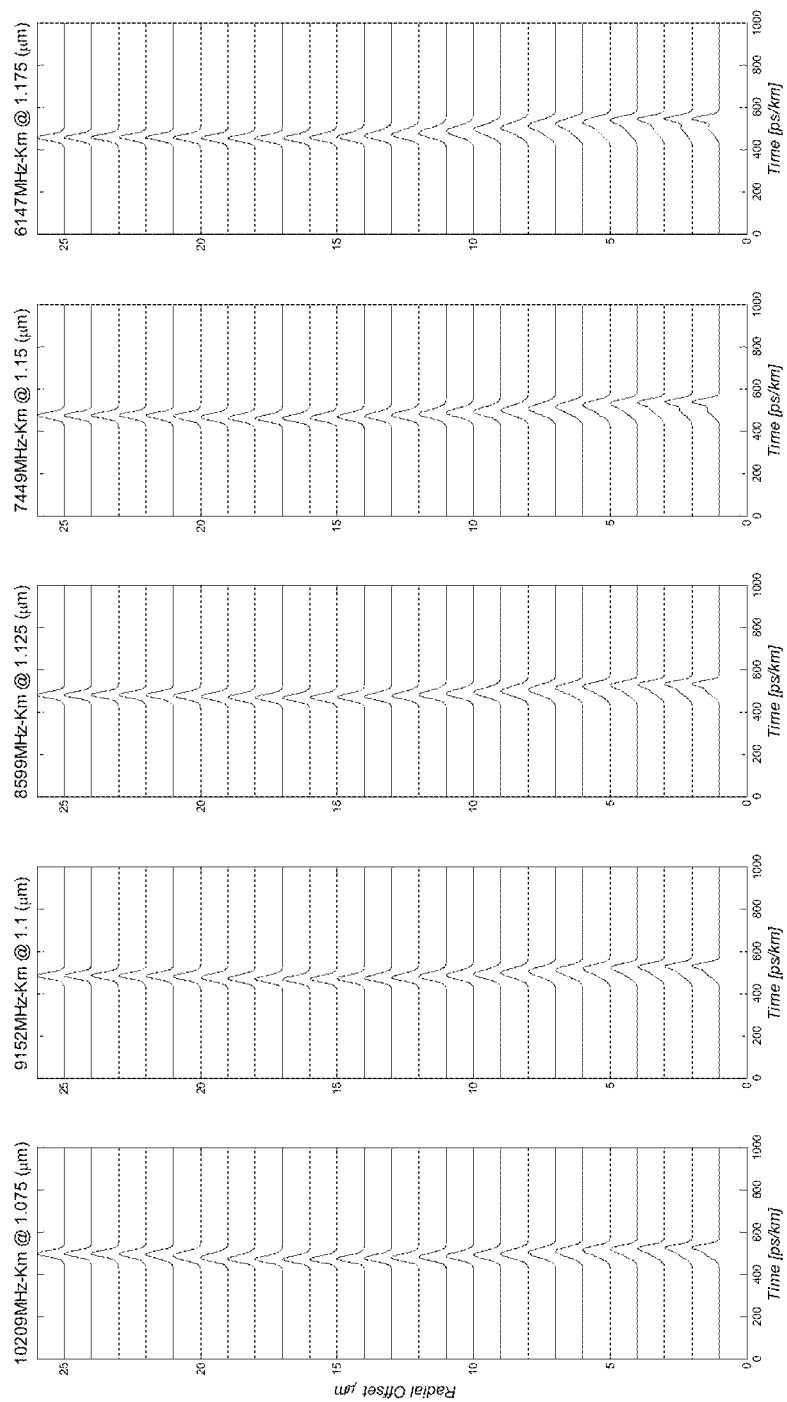
Figure 18:
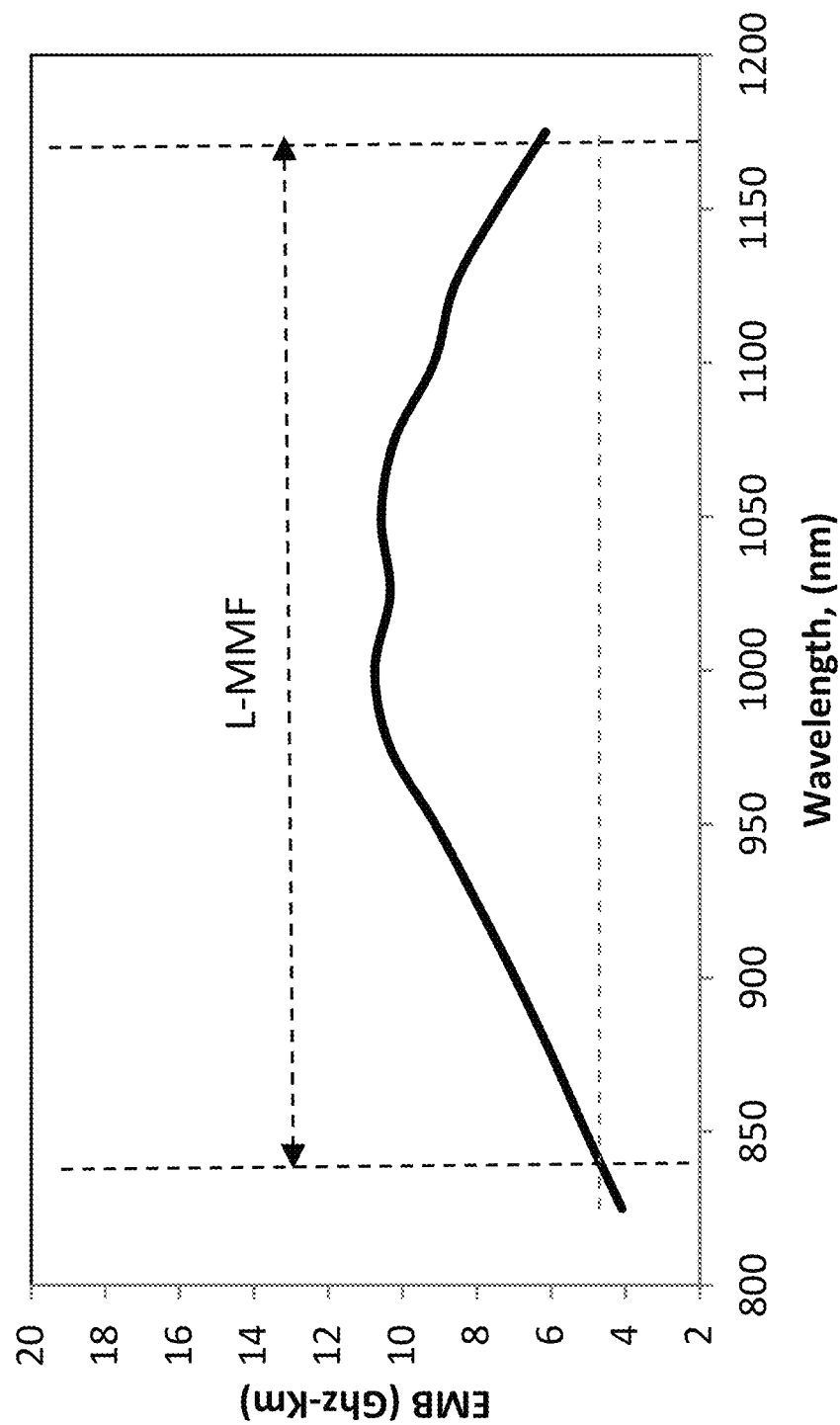
FIG. 18 illustrates an EMB summary for the fiber of FIG. 13.

Given the maximum relative group delays, it is then possible to determine a series of DMD plots for a respective fiber. FIGS. 15-17 show the DMD plots computed for the maximum relative group delays of the fiber with $\alpha_d$=2.1147. The DMD pulses in these plots were computed using TIA's procedure described in the FOTP-220 standard, which is incorporated herein by reference in its entirety. These plots simulate the measured DMD pulses at each wavelength as indicated at the top of each figure. Having a DMD plot for a given wavelength, it is then possible to compute the EMB for that respective wavelength. For the examples of FIGS. 15-17 the respective EMB values are provided at the top of each DMD plot, and a summary of the EMB values as a function of wavelength is provided in FIG. 18.

As another example, the method described in FIG. 11 may also be used to produce a broadband MMF that uses $P_2O_5$ as the core dopant and F as the cladding dopant. The addition of $P_2O_5$ dopant to the fiber's core has the effect of increasing the refractive index and therefore increasing the $\Delta$, i.e., the difference in core-cladding refractive index, reducing phase velocity and group velocity relative to pure Si, and varying the shape of the dispersion parameter $y(\lambda)$ and $\alpha_{opt}$. In order to maintain $\Delta \approx 1\%$ at an operating wavelength of about 850 nm to reduce coupling losses when mated with legacy fibers, modeling results indicate that Fluorine doping in the cladding and/or combined doping of $GeO_2$—$P_2O_5$ in the core may be preferred. This may allow the negative group delay condition to be maintained for at least 200 nm for EMB>4.7 GHz·km, and over 300 nm for OM3 fibers.

Figure 19:
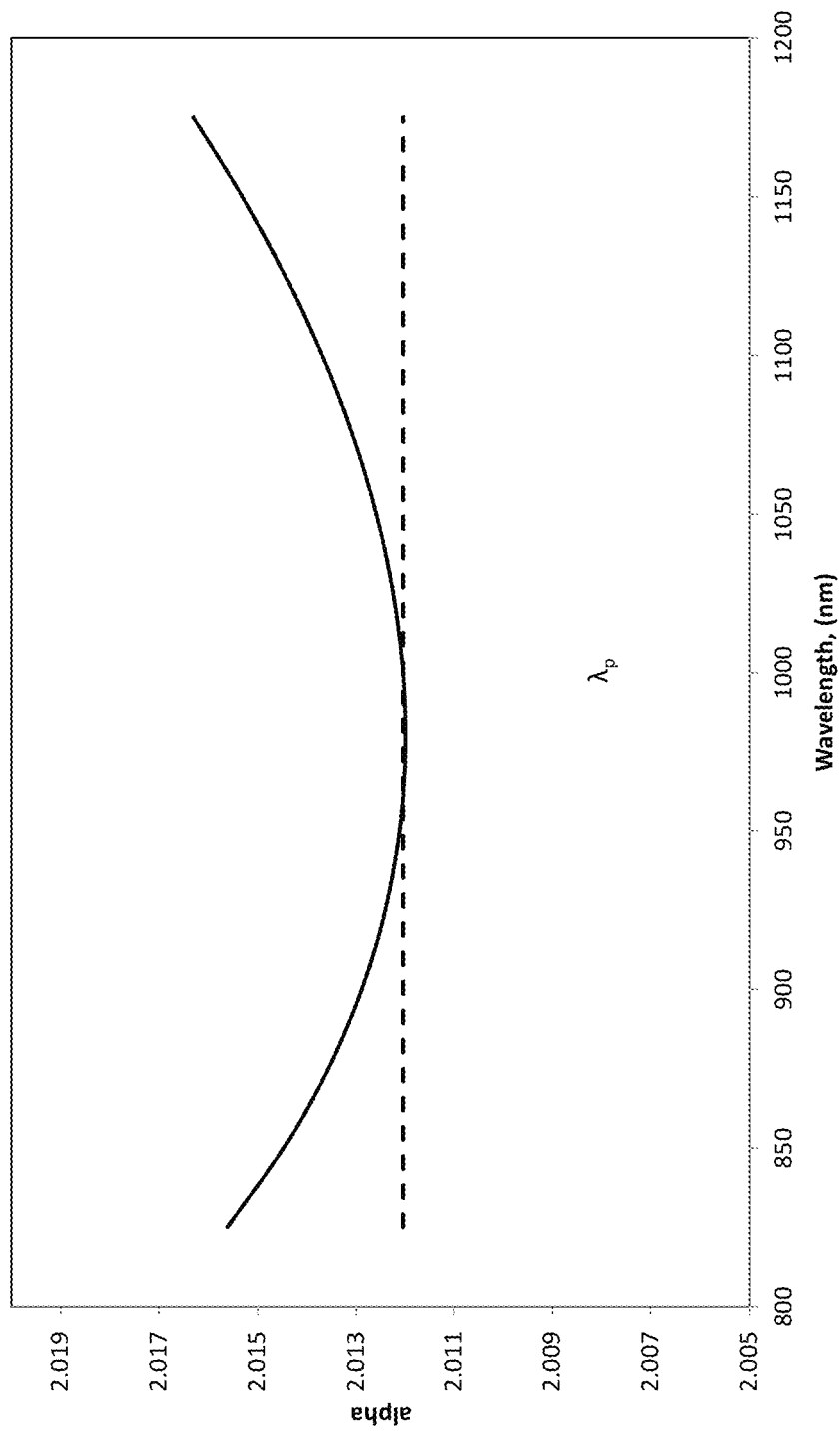
FIG. 19 illustrates an $\alpha_{opt}$ profile for a fiber according to another embodiment of the present invention.
Figure 20:
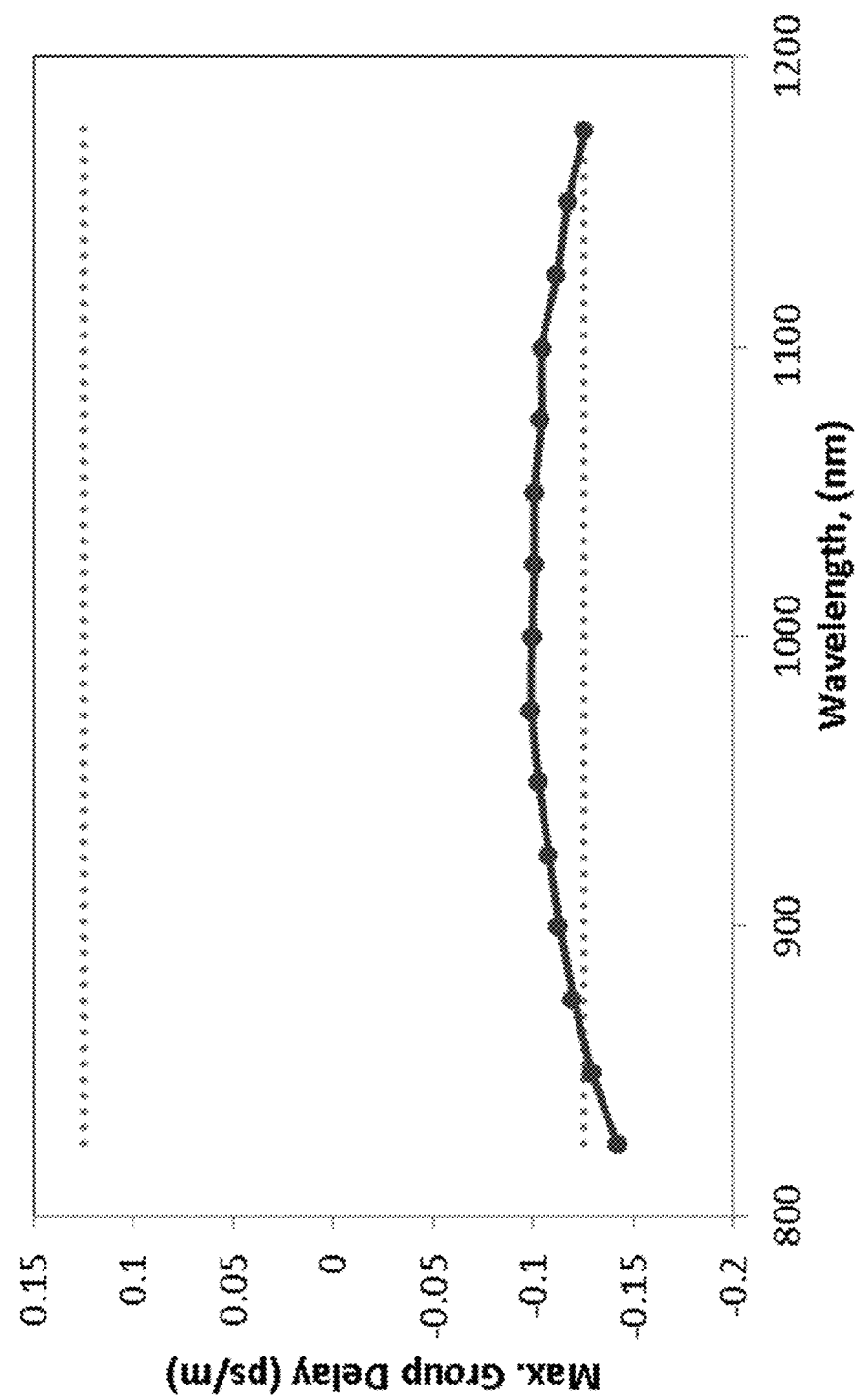
FIG. 20 illustrates maximum relative group delays for the fiber of FIG. 19.

In an embodiment, the fibers that satisfy the requirements for high EMB and negative group delays can have a core with $P_2O_5$ dopant concentration between 6 to 10 mol %. FIG. 19 illustrates an $\alpha_{opt}$ profile for a fiber having a 9.1 mol % concentration of $P_2O_5$ and 90.9 mol % concentration of $SiO_2$. Based on this profile, an $\alpha_d$ is selected to be 2.01205 (illustrated in FIG. 19 via a dashed line). The selected $\alpha_d$ provides a basis for deriving the maximum values for the relative mode group delays using equation (2). The maximum relative group delays as a function of wavelength for the target $\alpha_d$ are shown in FIG. 20, with the horizontal dotted lines representing represent the range limits of maximum delays for EMB>4.7 GHz·km.

Figure 21:
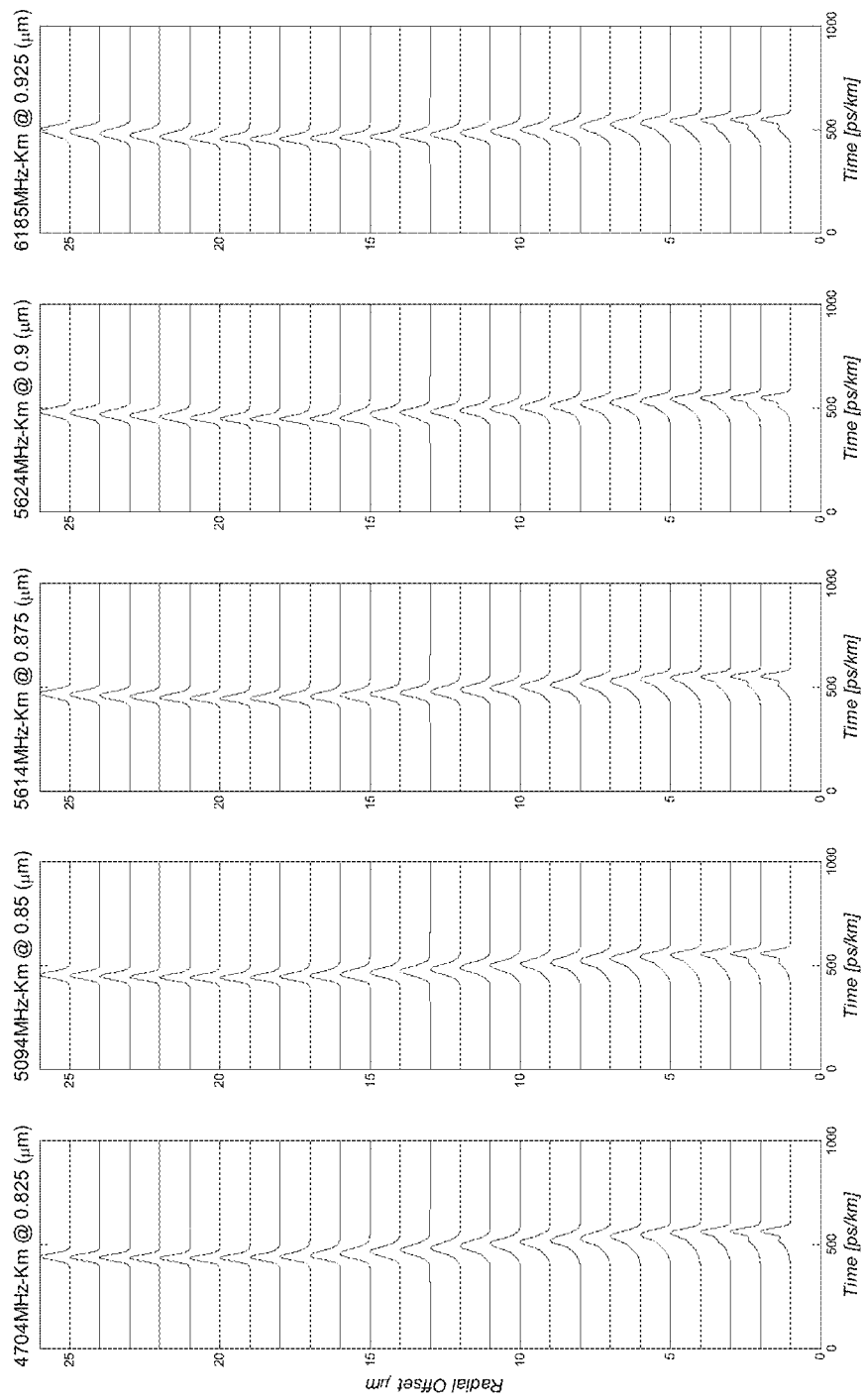
FIGS. 21-23 illustrate DMD plots for the fiber of FIG. 19.
Figure 22:
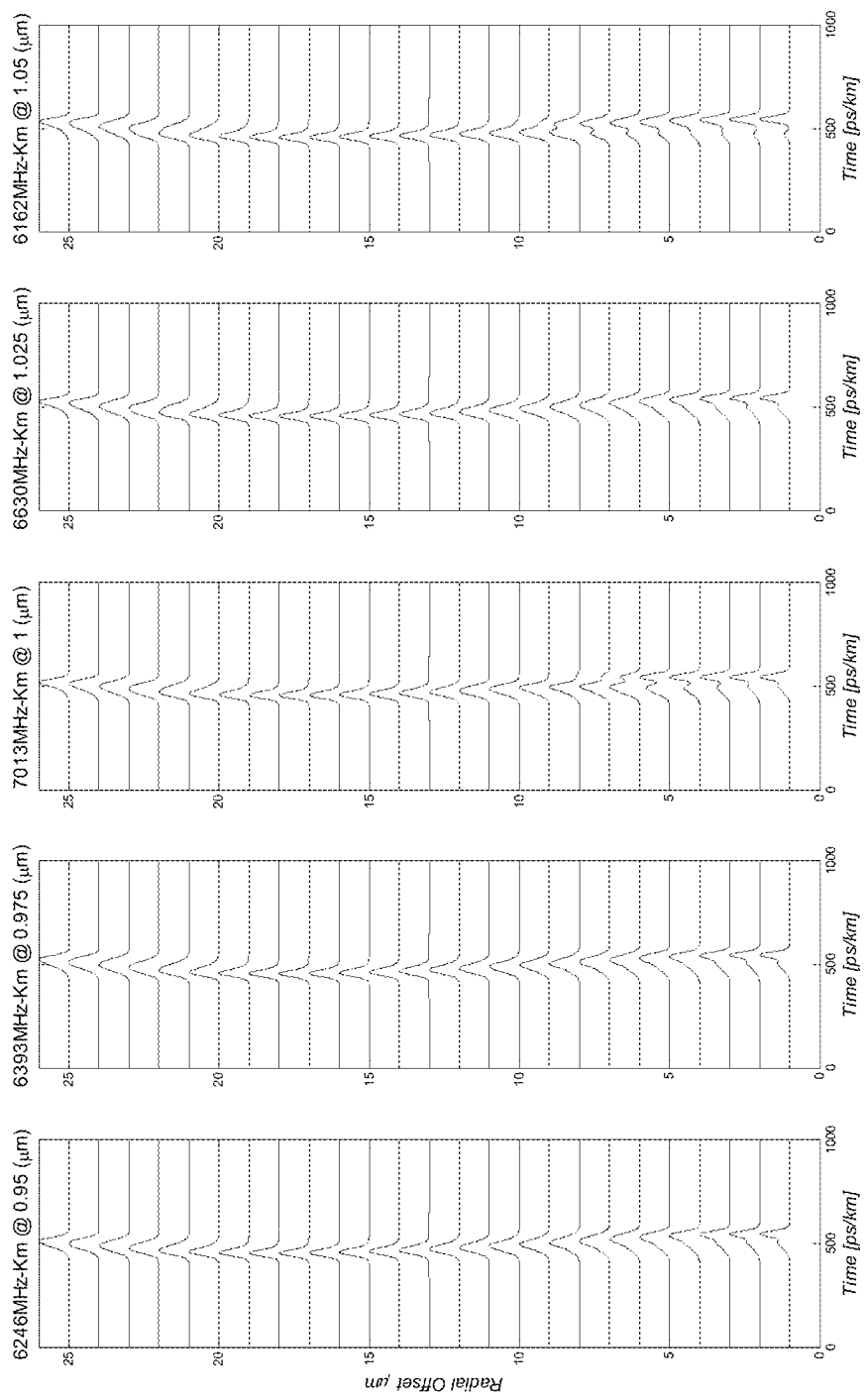
Figure 23:
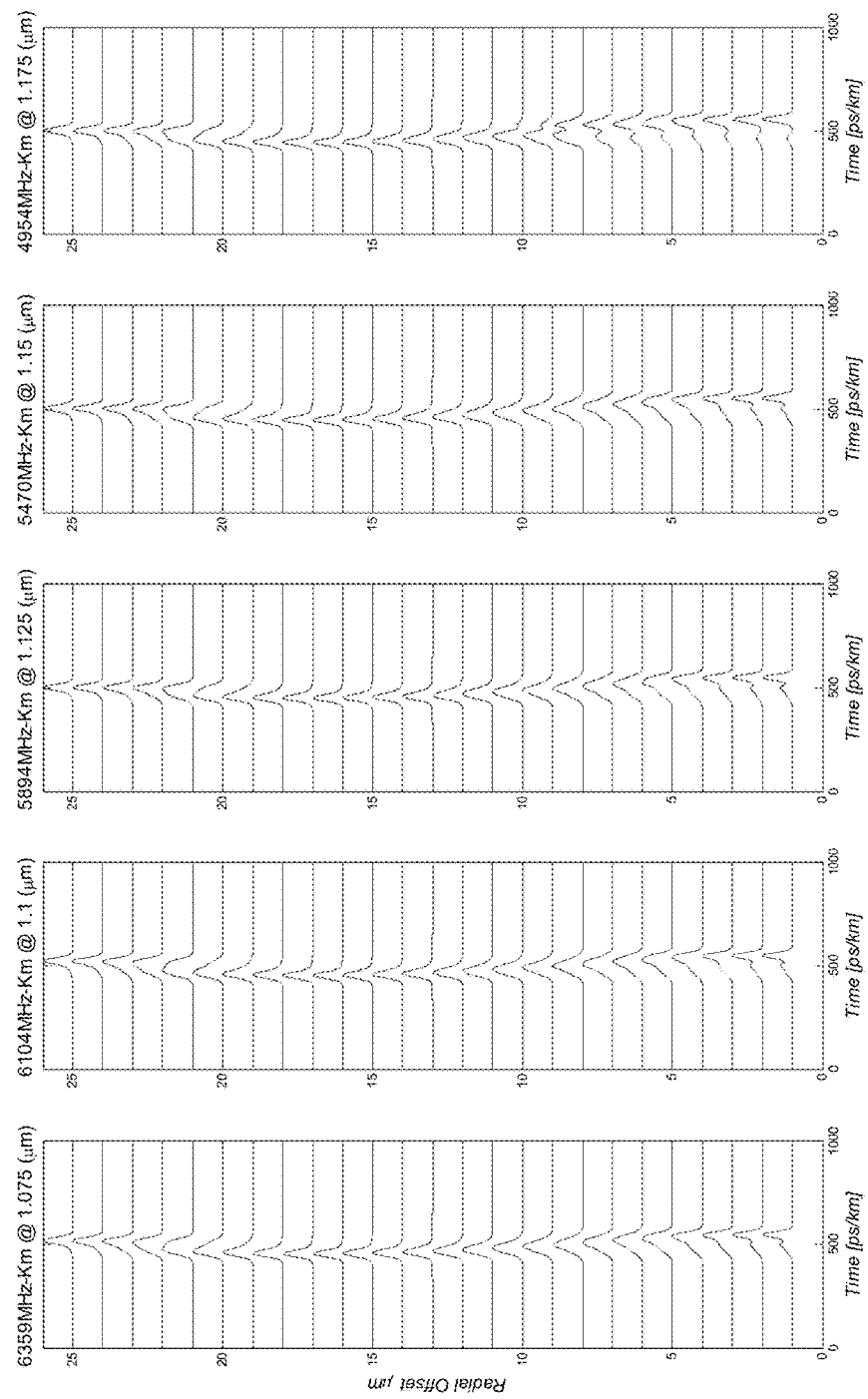
Figure 24:
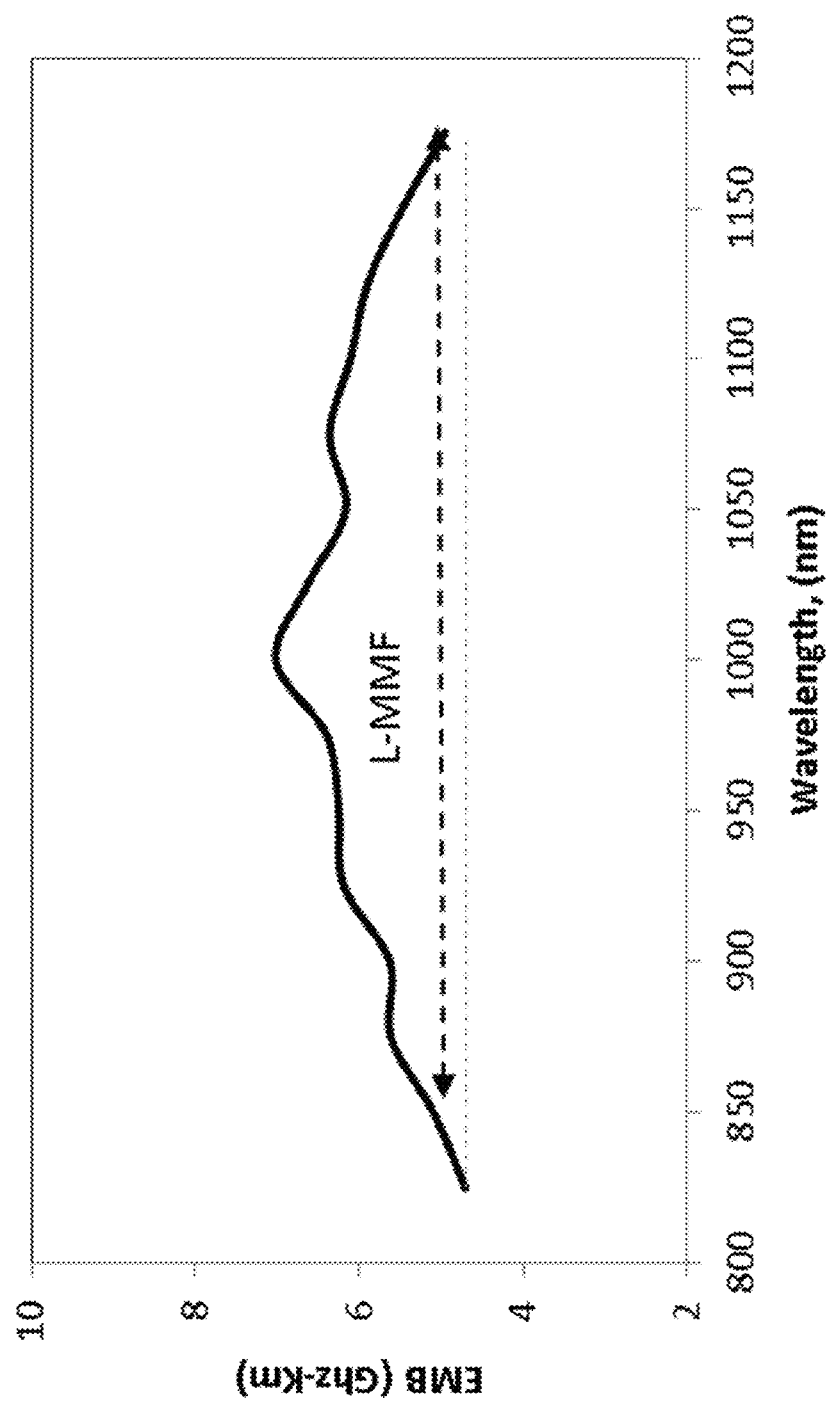
FIG. 24 illustrates an EMB summary for the fiber of FIG. 19.

From the derived group delays, it is then possible to determine a series of DMD plots for a respective fiber. FIGS. 21-23 show the DMD plots computed for the maximum relative group delays shown in FIG. 20. The DMD pulses in these plots were computed using TIA's procedure described in the FOTP-220 standard. These plots simulate the measured DMD pulses at each wavelength as indicated at the top of each figure. Having a DMD plot for a given wavelength, it is then possible to compute the EMB for that respective wavelength. For the examples of FIGS. 21-23 the respective EMB values are provided at the top of each DMD plot, and a summary of the EMB values as a function of wavelength is provided in FIG. 24.

Figure 25:
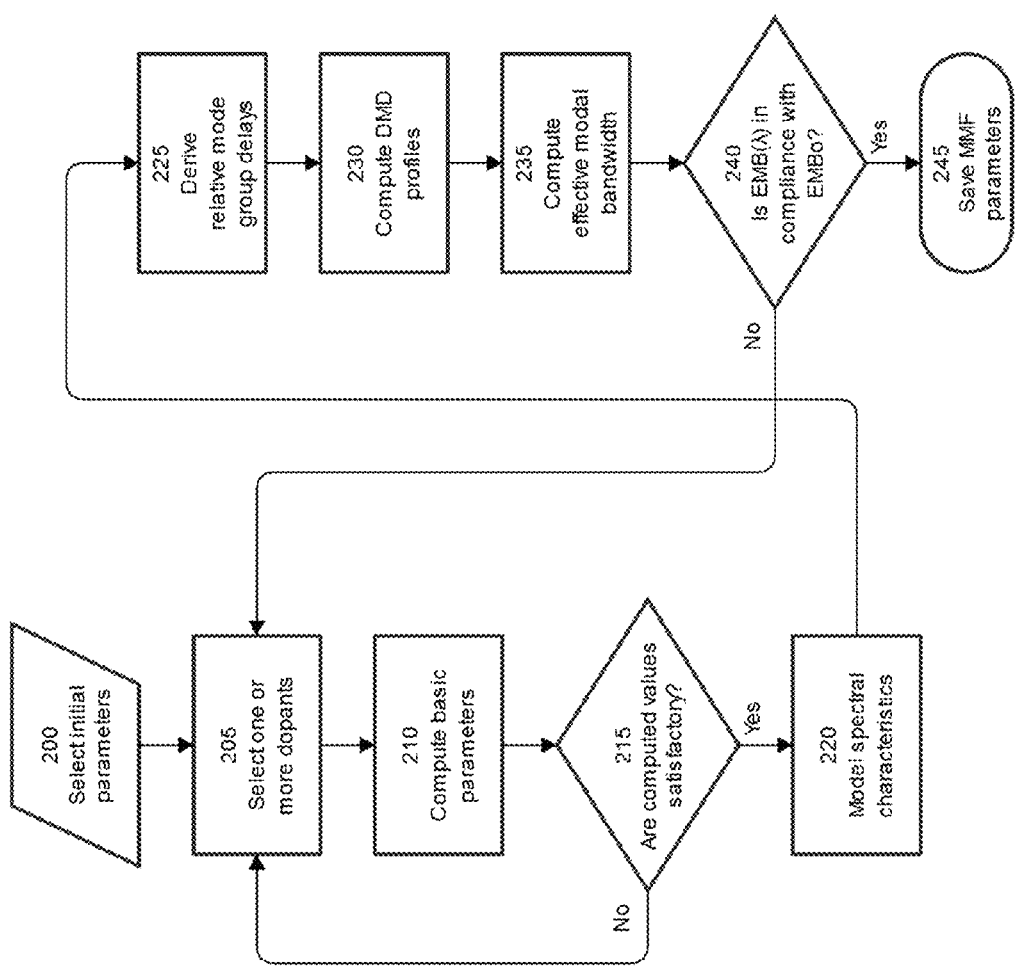
FIG. 25 illustrates a flow chart representative of a method according to another embodiment of the present invention.
Figure 26:
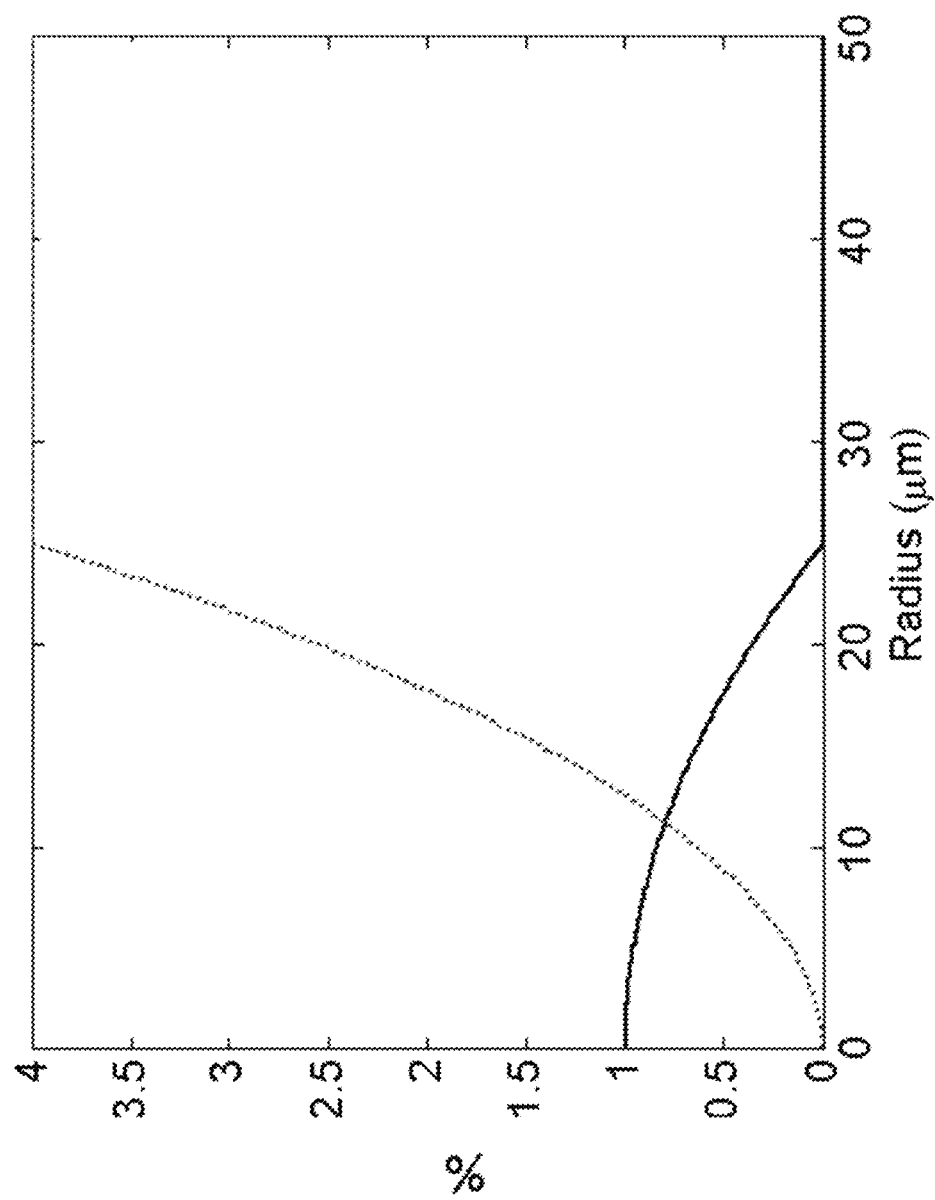
FIG. 26 illustrates a dopant concentration profile for a fiber according to an embodiment of the present invention.

Another method for designing an MMF according to an embodiment of the present invention is outlined in the flow chart of FIG. 25. This embodiment can be especially applicable in design and/or manufacturing processes of MMFs with two or more dopants where the $\alpha$-value of at least one dopant concentration profile is different from the $\alpha$-value of at least one other dopant concentration profile. An exemplary representation of a fiber having dopant concentration profiles differing with respect to their power exponent a is illustrated in FIG. 26. However, this method can still be used to design fibers using only a single primary dopant also.

In step 200, the initial parameters are selected for the MMF. These parameters can include, but are not limited to, numerical aperture, index contrast $\Delta$, core and cladding dimensions, peak EMB, maximum coupling loss, chromatic dispersion parameters (e.g., chromatic dispersion coefficient D, zero dispersion wavelength $\lambda_z$), manufacturing tolerances, and/or desired spectral windows for a minimum value of the effective modal bandwidth $EMB_0$. Once the initial parameters are provided, the dopants together with respective concentrations are selected in step 205. The selection in step 205 may be based on some pre-existing criteria, such as, for example, a library of dopants compatible for the fabrication of $SiO_2$ fiber core and cladding. Alternatively, the selection in step 205 may be random.

Upon the selection of the dopants and respective concentrations, an initial verification step 210 is performed where the basic characteristics such as, but not limited to, numerical aperture and $\lambda$ are computed for the selected materials and concentrations. The initial verification can allow for a relatively early determination of whether the selected material will result in an MMF that falls within some desired guidelines. This can be especially useful in determining whether the MMF will satisfy certain standards characteristics such as those defined by the OM3 and OM4 standards. This determination can be made in step 215 where if it is determined that the MMF will not satisfy some predetermined criteria, a new selection of a dopants and concentration profiles must be made in step 205. While this verification and comparison process embodied by the two steps 210 and 215 is performed immediately after the dopants selection step of 205, this is not a requirement. Instead it may be performed during any time following step 205. However, for practical purposes, early determination of a non-compatible selection in step 205 may provide time, computing, and/or cost savings.

If at step 215 it is determined that the selected materials and concentrations are satisfactory, in step 220 the spectral characteristics of the fiber with the selected materials are modeled using the Sellmeier coefficients given by:

$$n^2(\lambda) = 1 + \sum_{i=1}^{3} \frac{a_i \lambda^2}{\lambda^2 - b_i^2} \tag{7}$$

Because the concentrations of the dopants vary along the radial position of the fiber's core, modeling of the spectral characteristics is achieved by taking this radial variance into consideration. Consequently, equation (7) becomes a function of λ and r, and also takes into consideration that more than one dopant may be used.

After determining the spectral characteristics for the MMF, the relative mode group delays $t_g(\lambda)$ are derived in step 225 by using numerical models, such as for example Wentzel-Kramer-Brillouin or Finite Time Domain Difference; the differential mode delay (DMD) profiles are computed in step 230 from the earlier-derived mode group delays $t_g(\lambda)$; and the effective modal bandwidth EMB(λ) is computed in step 235 from the earlier computed DMD profiles.

Thereafter, a final verification of performance compliance is made in step 240 where the values obtained in steps 225, 230 and/or 235 are evaluated. In one example, the evaluation in step 240 can be limited to the evaluation of the EMB(λ) to verify that it is in compliance with the minimum required value $EMB_0$ for the spectral window originally defined in step 200. In other examples, the values derived in steps 230 can also be evaluated. For instance, the DMD plots can be evaluated for visual confirmation of fiber's transmission characteristics (e.g., the presence of a left shift of the majority of peak pulse at increasing radial offsets at various wavelengths). Moreover, the plots can be used to measure the DMD value at various operating wavelengths which in it of itself can be a prerequisite to meeting some preexisting standard. Note that the recitation of verification processes is not meant to be limiting and/or exhaustive. If the verification process returns a favorable result, the MMF parameters are saved in step 245 for later use such as, for example, the manufacture of the MMF. If, on the other hand, the verification step 240 fails, steps 205-240 are repeated for a new dopant and/or concentration.

As an example, the method described in FIG. 25 may be used to produce a broadband MMF that uses Ge and F as its dopants. FIG. 26 illustrates exemplary concentration profiles for the Ge and F dopants, with Ge mol % concentration being represented via the solid line and F mol % concentration being represented via the dotted line. Both of these concentrations can be represented with the following equations as a function of radial offset r from the center of the core:

$$\text{For Ge: } X_{Ge}(r) = X_{Ge}^{Max}\left(1 - \left(\frac{r}{a}\right)^{\alpha_d^{Ge}}\right) \quad (8)$$

$$\text{For F: } X_F(r) = X_F^{Max}\left(\left(\frac{r}{a}\right)^{\alpha_d^F}\right) \quad (9)$$

where $\alpha_d^{Ge}$ and $\alpha_d^F$ are parameters which determine the shape of the respective dopant concentration profile and $X_{Ge}^{Max}$ and $X_F^{Max}$ are parameters that define the maximum concentrations of respective dopants at some radial offset position. The values for these parameters can be selected based on some pre-existing criteria, such as, for example, generally known dopant concentrations and concentration profile shapes, or at random. In the example of FIG. 26, the $\alpha_d$ values are selected to be $\alpha_d^{Ge}=1.9963$ and $\alpha_d^F=2.0093$.

Figure 27:
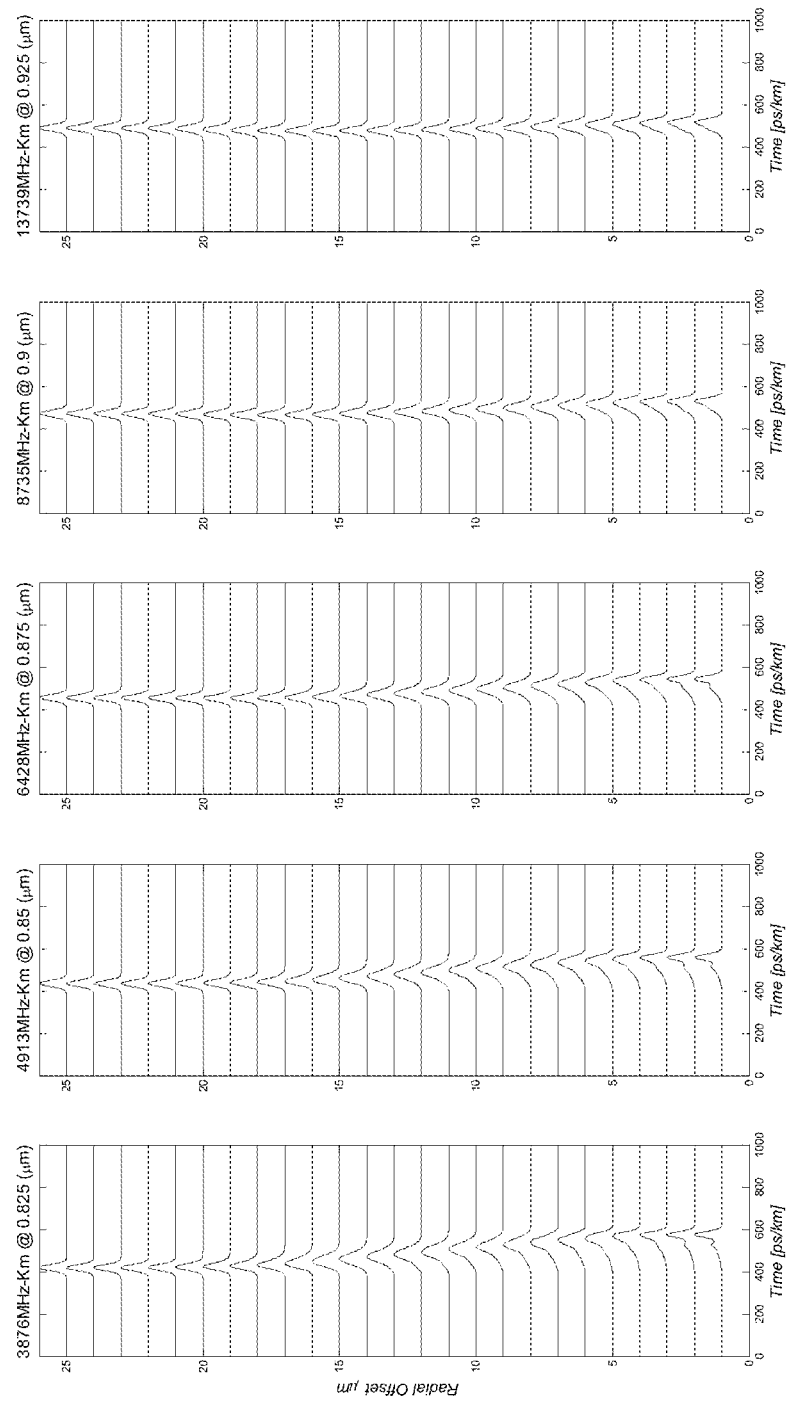
FIGS. 27-29 illustrate DMD plots for the fiber of FIG. 26.
Figure 28:
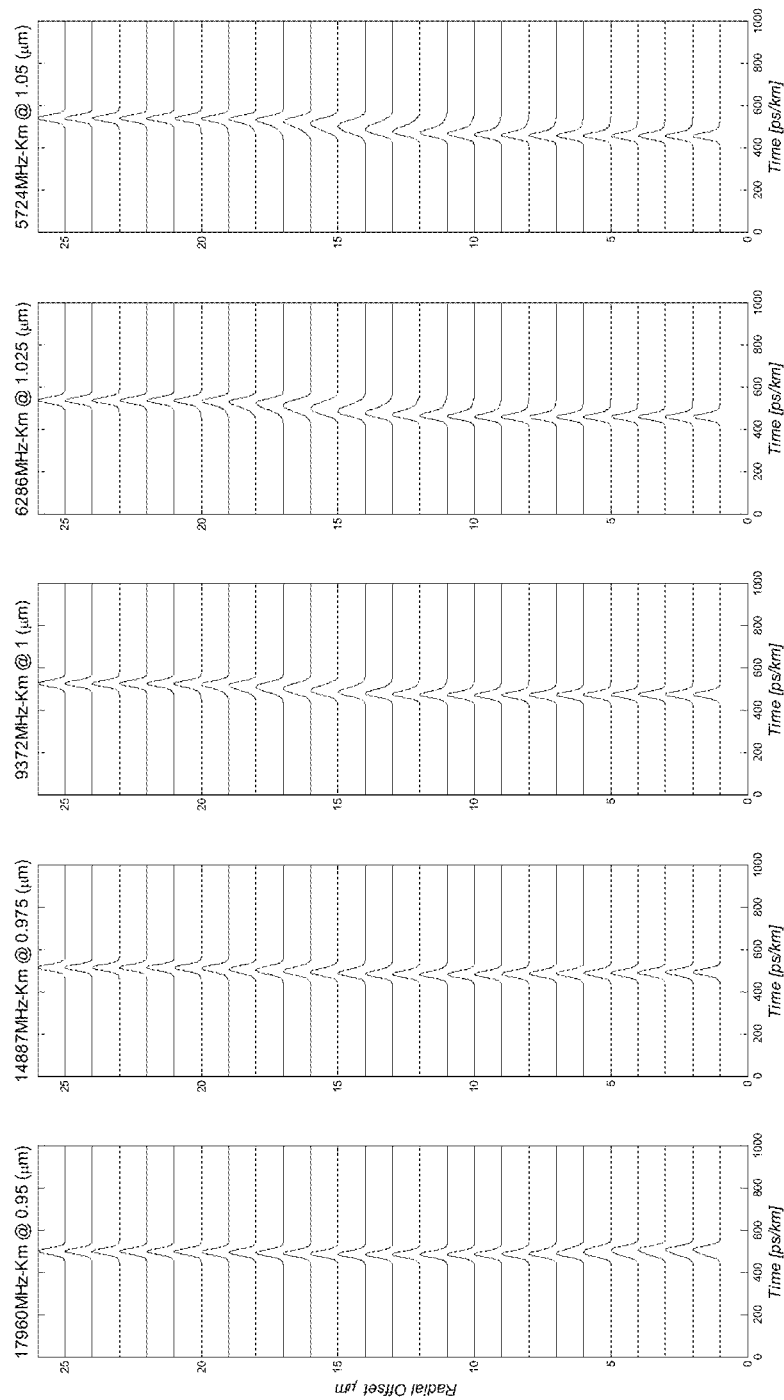
Figure 29:
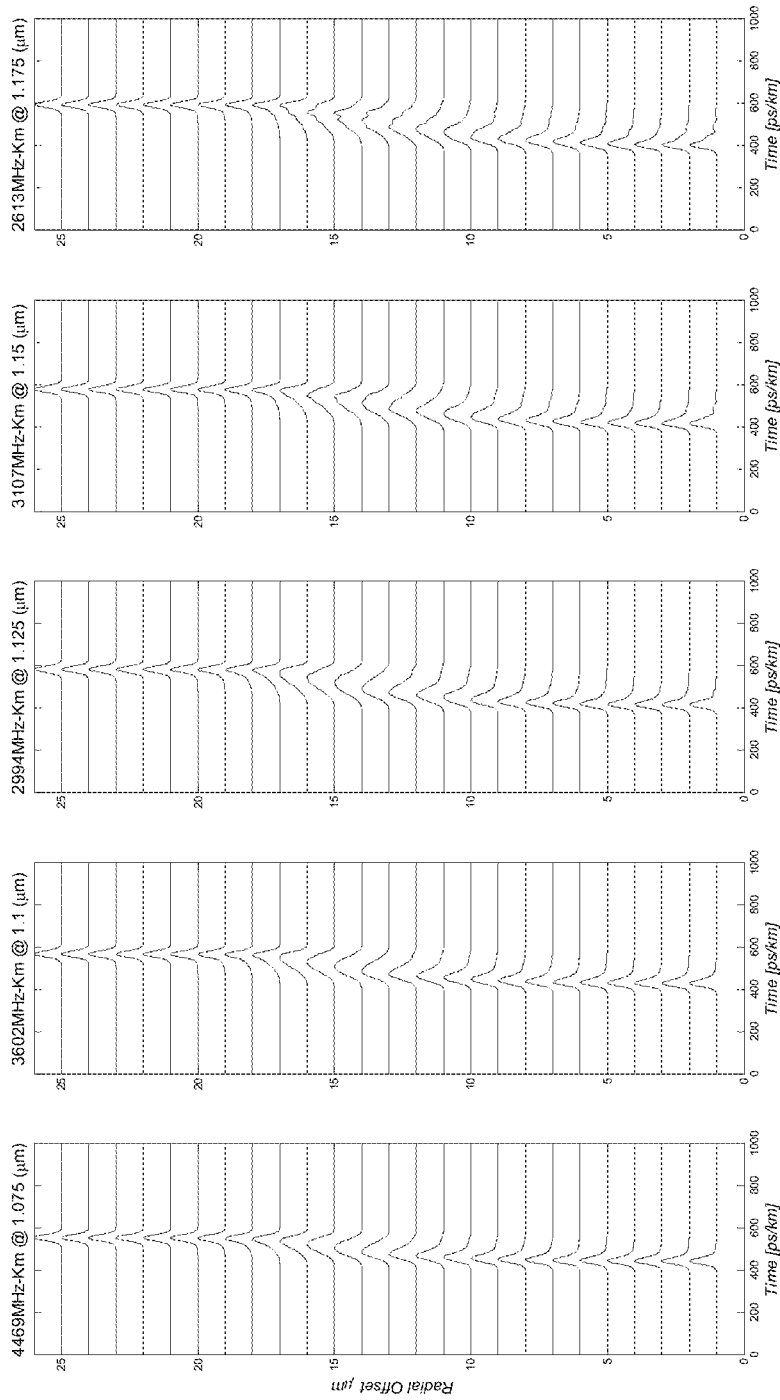
Figure 30:
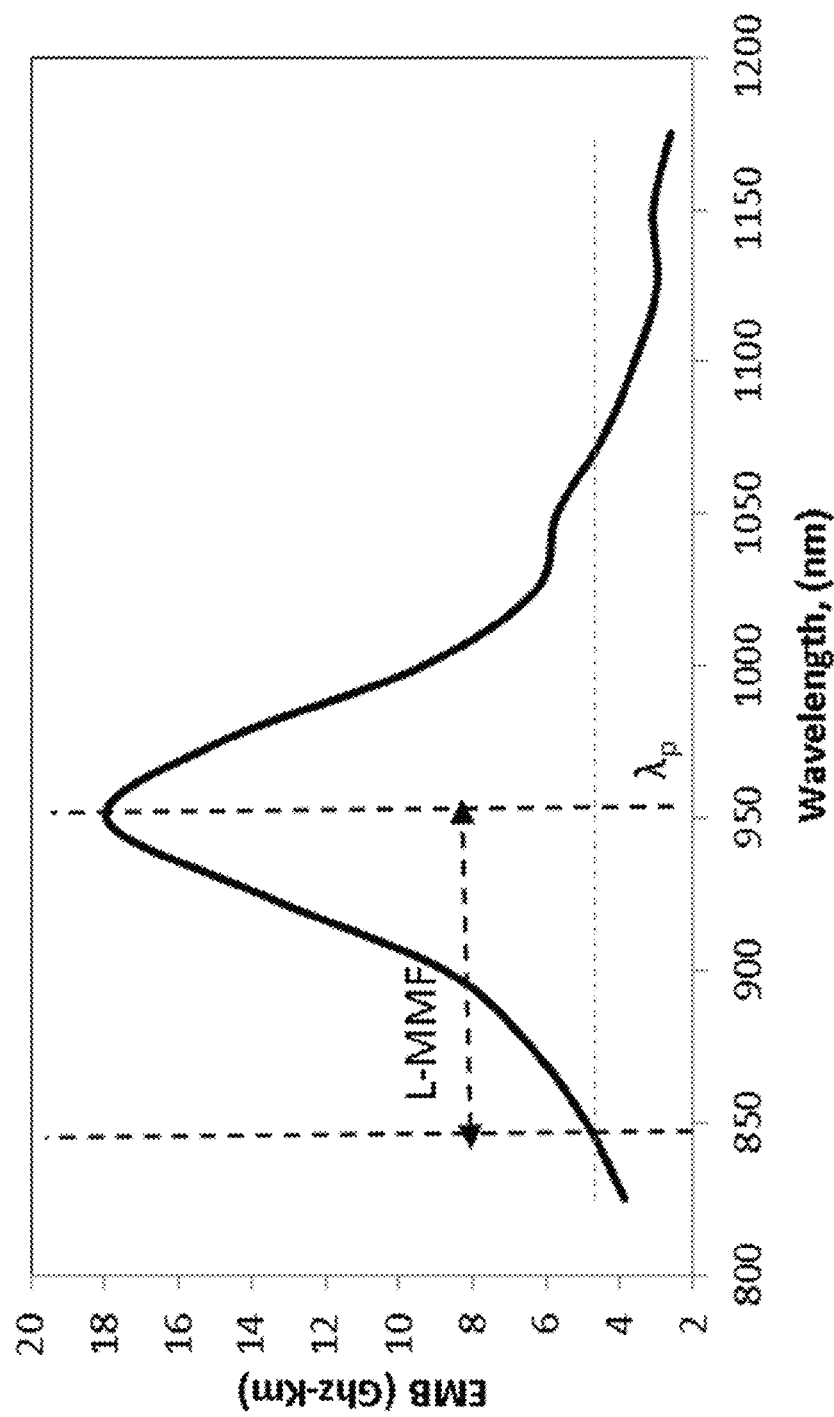
FIG. 30 illustrates an EMB summary for the fiber of FIG. 26.

Taking equations (8) and (9) into consideration it is then possible to generate the spectral characteristics of the fiber as a function of radial offset r and wavelength λ. Expanding on equation (7), the resultant refractive index profile is computed using:

$$n^2(r, \lambda) = 1 + \sum_{i=1}^{3} \frac{(a_i + X_{Ge}(r)da_i^{Ge} + X_F(r)da_i^F)\lambda^2}{\lambda^2 - (b_i + X_{Ge}(r)db_i^{Ge} + X_F(r)db_i^F)} \quad (10)$$

where $X_{Ge}$ and $X_F$ are the mole fractions, and $da_i$ the $db_i$ the material specific variation terms. Given the result-set of equation (10), it is possible to derive the maximum values for the relative mode group delays, and then using those values to determine a series of DMD plots for the respective fiber as shown in FIGS. 27-29. The DMD pulses in these plots were computed using TIA's procedure described in the FOTP-220 standard. These plots simulate the measured DMD pulses at each wavelength as indicated at the top of each figure (825 nm to 1175 nm). Having a DMD plot for a given wavelength, it is then possible to compute the EMB for that respective wavelength. For the examples of FIGS. 27-29 the respective EMB values are provided at the top of each DMD plot, and a summary of the EMB values as a function of wavelength is provided in FIG. 30. In these figures it is observed that the negative DMD tilt (e.g., the L-MMF) and the EMB≥4.7 GHz·km conditions can be maintained from 850 nm to 950 nm.

These results indicate that using the MMF of the currently described embodiment can be especially advantageous in the shorter wavelengths region of about 850 nm to about 950 nm. At longer wavelengths (e.g., >975 nm) the attenuation and chromatic dispersion can be significantly lower accounting for a least 2 dB reduction in transmission penalties compared with the penalties at 850 nm. Therefore, at those longer wavelengths MCDC may not be required. By modifying the exponents in the dopant concentration functions shown in equations (8) and (9), the peak EMB wavelength or $\lambda_p$ can be shifted either to the left or to the right. For example by using $\alpha_d^{Ge}=1.9963$ and $\alpha_d^F=2.0163$, $\lambda_p$ becomes ~900 nm.

Concepts disclosed herein can be applied to designing optical fibers for use with laser transceivers emitting multiple transverse modes (e.g., VCSEL transceivers). This fiber can be used in channels requiring the transmission and receiving of multiple signals over a broad range of wavelengths.

Concepts embodied by the present invention may be applicable in unidirectional and/or bidirectional CWDM (coarse wavelength-division multiplexing). It has been recognized that performance of CWDM systems depend not only on modal bandwidth, but also on the total bandwidth resulting from the modal and chromatic dispersion interaction.

Figure 31:
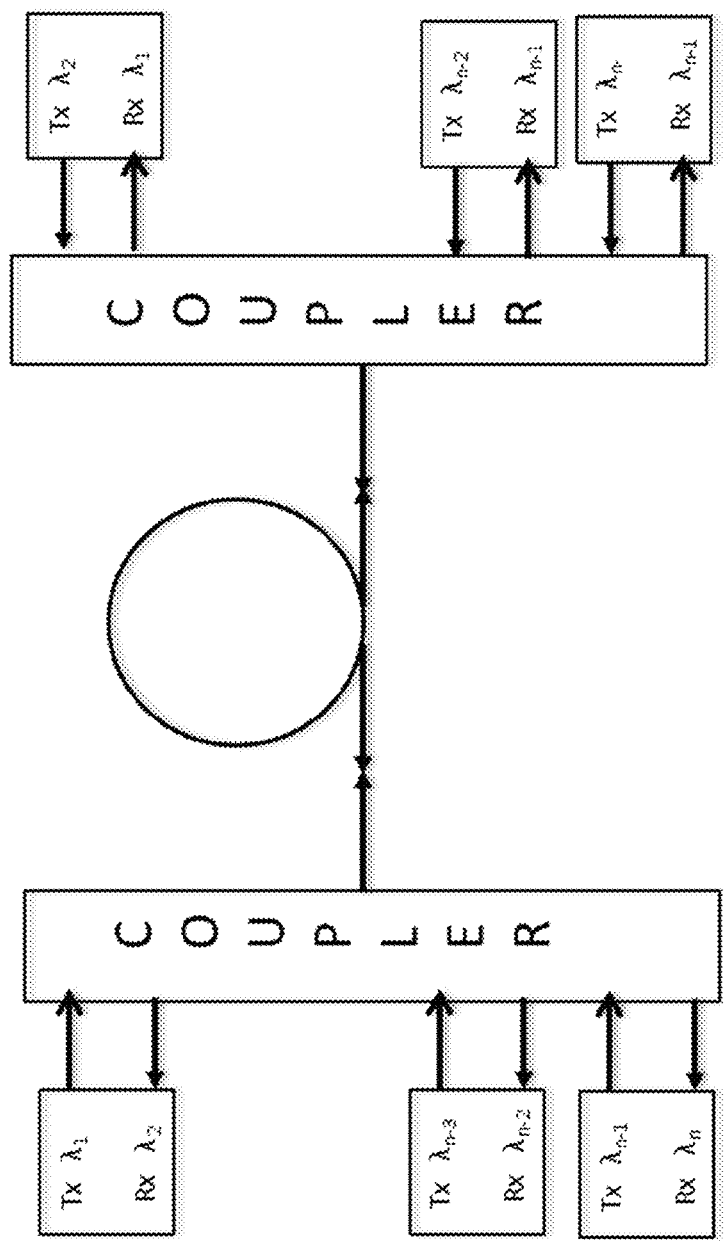
FIG. 31 illustrates an exemplary CWDM system according to an embodiment of the present invention.
Figure 32:
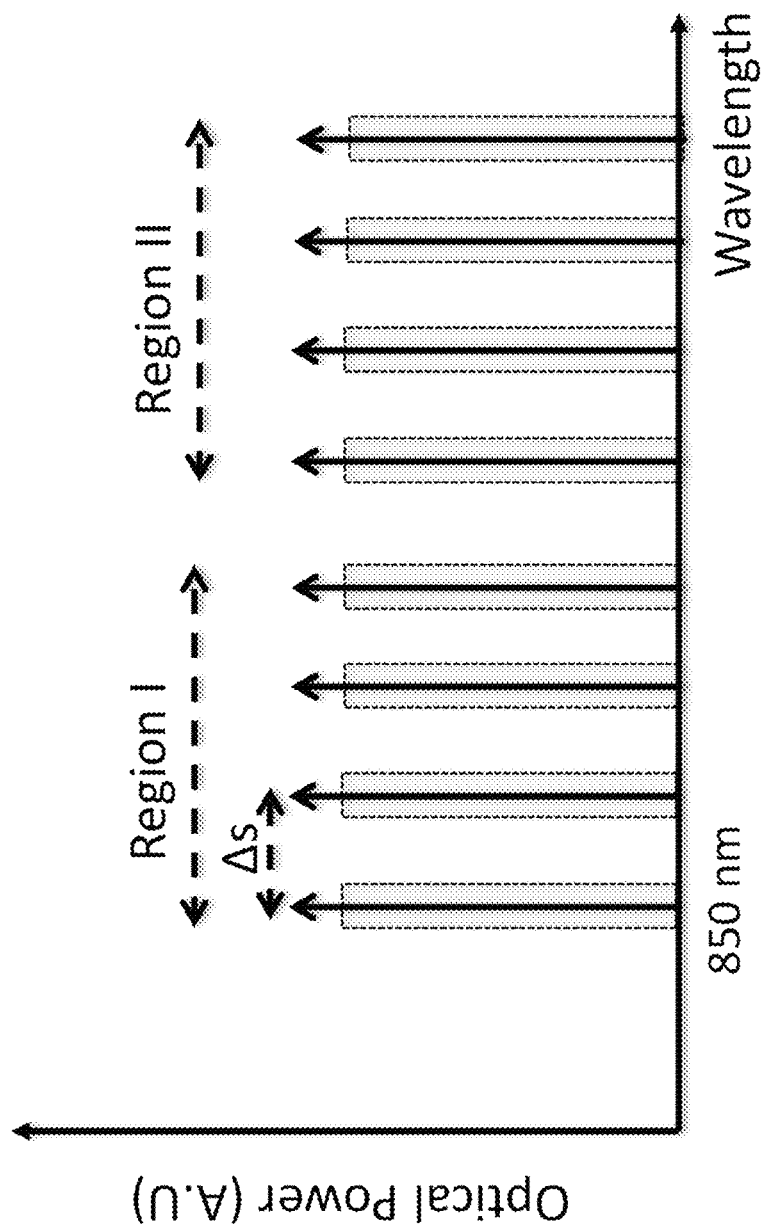
FIG. 32 illustrates operational wavelength channels for the CWDM system of FIG. 31.
Figure 33:
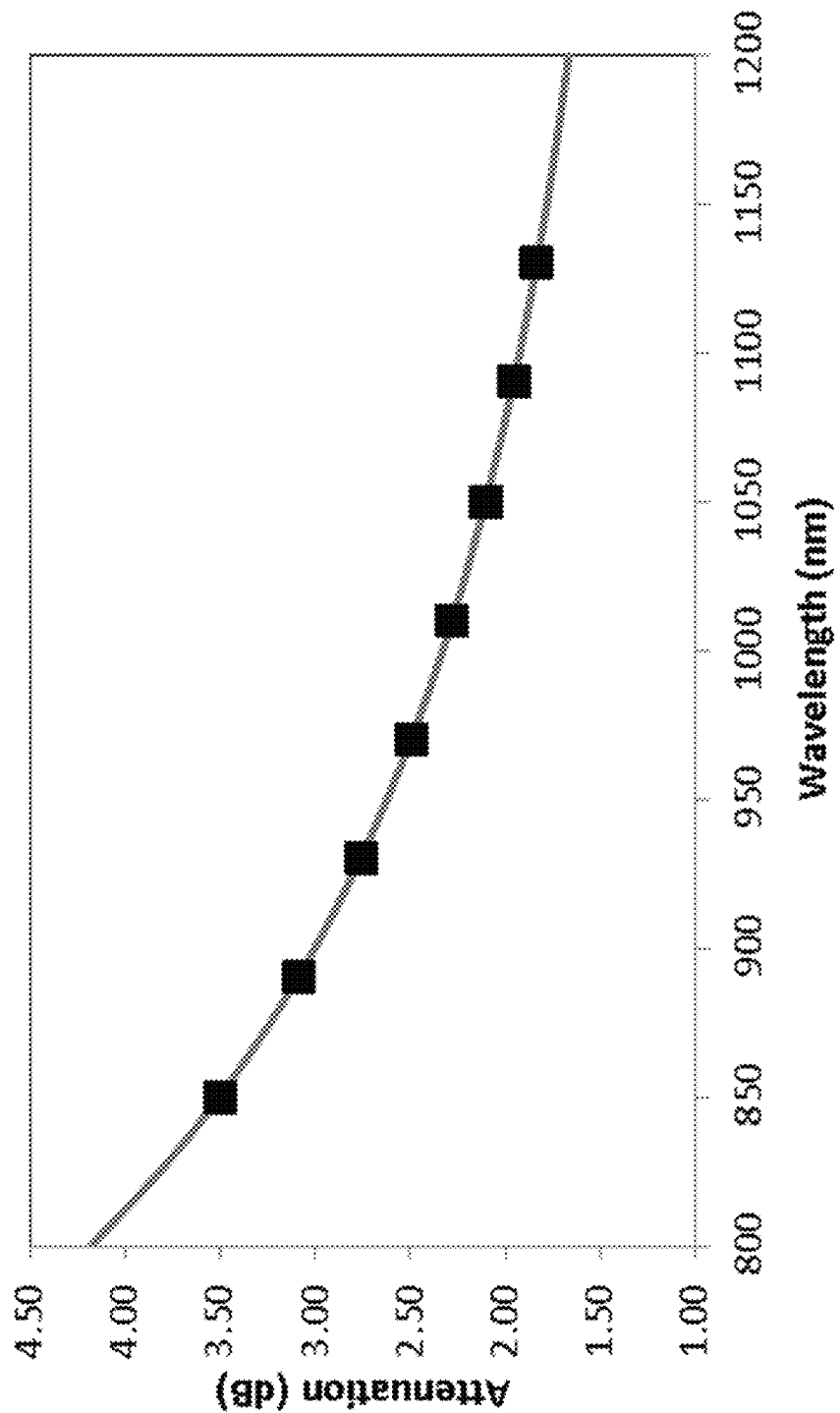
FIG. 33 illustrates attenuation for the CWDM system of FIG. 31.
Figure 34:
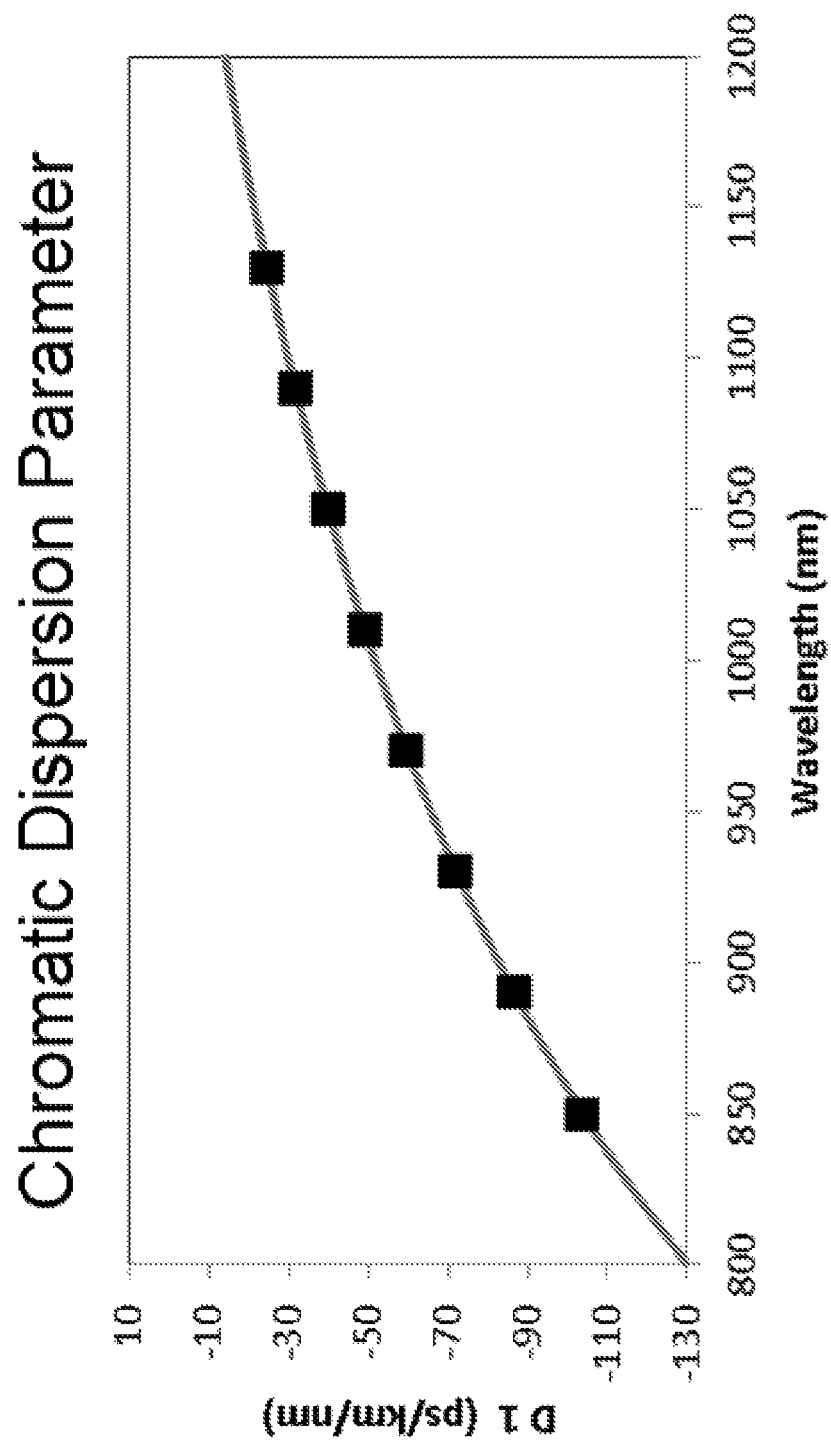
FIG. 34 illustrates chromatic dispersion for the CWDM system of FIG. 31.

In order to equalize the reach or performance of the transmitter wavelength in a CWDM channel as illustrated in FIG. 31, MCDC (modal-chromatic dispersion compensation) should preferably be applied to the shorter wavelength of the utilized spectra in such a way that the penalties due to dispersion and attenuation are balanced. For example, FIG. 32 shows the case where n=8 wavelengths separated by Δs=40 nm. This configuration may allow 100 Gbps or 128 Gbps bidirectional transmission per fiber by multiplexing different wavelength VCSELs with serial rates of 25 Gbps or 28 Gbps. It may also enable 200 Gbps bidirectional transmission per fiber using VCSEL transceivers with serial rates of 50 Gbps. Transceivers operating with the first 4 shorter wavelengths (i.e., 850 nm to 970 nm) are subject of significantly more attenuation (as shown in FIG. 33) and chromatic dispersion (as shown in FIG. 34) than transmitters operating with the longer wavelengths. Therefore, the impact of MCDI (modal-chromatic dispersion interaction) described herein can be more significant for the shorter wavelengths than the longer wavelengths.

Additionally, design techniques described herein may be combined with any known fiber manufacturing techniques to the extent necessary. For example, those of ordinary skill will be familiar with the general concept of manufacturing optical fibers where in a first stage a preform is produced and in a second stage a fiber is drawn from that preform. Those familiar with the relevant art will also be familiar with the techniques used to introduce/add one or more dopants during the manufacturing stages. This step typically occurs during the preform formation stage where a controlled introduction of dopants results in a preform having some desired dopant concentration profile. In some embodiments, it is at this stage that the selected dopants can be controlled in accordance with the design parameters of the present invention. Furthermore, in some embodiments, the reference to a "broad spectral region" may be understood to refer to a region that is at least 50 nm, at least 100 nm, at least 150 nm, at least 200 nm, at least 250 nm, and/or at least 300 nm. However, this should not be interpreted as limiting the meaning of the term "broad spectral region," as in some embodiments this term may also have a customary meaning as would be understood by those of ordinary skill in the relevant art.

Note that while this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. It should also be noted that there are many alternative ways of implementing the methods and apparatuses of the present invention. For example, while extensive references have been made to VCSEL systems throughout the specification, the present invention may be implemented with other, non-VCSEL optical sources. It is therefore intended that claims that may follow be interpreted as including all such alterations, permutations, and equivalents as fall within the true spirit and scope of the present invention.

Furthermore, the subject matter described herein, such as for example the methods for designing and/or manufacturing an MMF in accordance with the present invention, can be implemented at least partially in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps of a method or process. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. Devices embodying the subject matter described herein may be manufactured by any means, such as by semiconductor fabrication or discreet component assembly although other types of manufacturer are also acceptable, and can be manufactured of any material, e.g., CMOS.

REFERENCES

The following references are incorporated herein in their entirety:
Jack Jewell, "Extended Wavelength Receivers for forward compatibility," Presented in T11 PI6, June 2013 ftp://ftp.t10.org/t11/document.13/13-214v0.pdf;
Buck, Fundamentals of Optical Fibers, Willey, April 204, ISBN: 978-0-471-22191-3;
TIA-455-220-A, "DMD Measurement of Multimode Fiber in the Time Domain," January 2003;
IEC 60793-1-49, "Measurement methods and test procedures—Differential Mode Delay";
Gholami A., Molin, D., Sillard, P., "Physical Modeling of 10 GbE Optical Communication Systems," IEEE OSA JLT, 29(1), 2011, pp. 115-123;
J. Castro, R. Pimpinella, B. Kose, and B. Lane, "Investigation of the Interaction of Modal and Chromatic Dispersion in VCSEL-MMF Channels," IEEE OSA JLT, 30(15), pp. 2532-2541;
R. Pimpinella, J. Castro, B/Kose, and B. Lane, "Dispersion Compensated Multimode Fiber," Proceeding of the 60th IWCS 2011;
J. Castro, R. Pimpinella, B. Kose, and B. Lane, "Mode Partition Noise and Modal-Chromatic Dispersion Interaction Effects on Random Jitter," IEEE OSA JLT, 31(15), pp. 2629-2638;
Marcuse, Principles of Optical Fiber Measurements, Academic Press, NY, 1981;
Solomon Musikant, Optical Materials, CRC Press, May 22, 1985;
H. M. Presby and 1. P. Kaminow, "Binary silica optical fibers: refractive index and profile dispersion measurements," Applied Optics, Vol. 15, Issue 12, pp. 3029-3036 (1976);
C. R. Hammond, "Silica Based Binary Glass Systems: wavelength dispersive properties and composition in optical fibers," Optical and Quantum Electronics, vol, 10, pp. 163-170, 1977;
O. V. Butov, et al. "Refractive index dispersion of doped silica for fiber optics,", Optics Communication, vol 213, pp. 301-308, 2002.

We claim:

1. A multimode optical fiber (MMF) for operating within a spectral window, said MMF having one of a peak effective modal bandwidth or a minimum effective modal bandwidth at wavelength $\lambda_p$, said MMF comprising:
 a cladding having a refractive index of $n_2$; and
 a core, said core having a radius a and a refractive index profile comprised of refractive indices n(r) defined by a function of a radial distance r from a center of said core to a:

$$n(r) = n_1 \sqrt{1 - 2\Delta\left(\frac{r}{a}\right)^\alpha}$$

where:
 $n_1$ is a refractive index at said center of said core;
 $\alpha$ is a parameter defining a shape of the refractive index profile; and
 $\Delta = (n_1 - n_2)/n_1$, said core further having an $\alpha_{opt}$ profile comprised of values $\alpha_{opt}(\Delta)$ defined by a function of wavelength $\lambda$, where for a given $\lambda$ said $\alpha_{opt}(\lambda)$ value minimizes a group delay of said MMF when said $\alpha$ is set equal to $\alpha_{opt}(\lambda)$, said $\alpha_{opt}$ profile having one of a concave shape with a maximum at $\alpha_{opt}(\lambda_p)$ or a convex shape with a minimum at $\alpha_{opt}(\Delta_p)$, wherein $\alpha \leq \alpha_{opt}(\lambda_p)$.

2. The MMF of claim 1, wherein said $\alpha_{opt}$ profile is defined by:

$$\alpha_{opt}(\lambda) = 2 + y(\lambda) - \Delta\frac{(4+y(\lambda))(3+y(\lambda))}{5+2y(\lambda)},$$

where:

$$y(\lambda) = -\frac{2n_1}{N_1}\frac{\lambda}{\Delta}\frac{d\Delta}{d\lambda},$$

and where $N_1$ is a group refractive index of said core at r=0.

3. The MMF of claim 1, wherein $\alpha < \alpha_{opt}(\lambda_p)$.

4. The MMF of claim 1, wherein said spectral window is at least 50 nm, and wherein within said spectral window said MMF has an effective modal bandwidth of greater than 4700 MHz·km.

5. The MMF of claim 4, wherein said spectral window is at least 100 nm.

6. The MMF of claim 4, wherein said spectral window is at least 200 nm.

7. The MMF of claim 1, wherein a differential mode delay (DMD) plot of said MMF exhibits a shift to the left of its higher order modes relative to its lower order modes.

8. The MMF of claim 7, wherein said DMD plot is measured with an optical pulse of a wavelength within said spectral window.

9. The MMF of claim 7, wherein said DMD plot is measured by launching a plurality of optical pulses into one end of said core at various radial distances r and observing an arrival of said optical pulses at another end of said core at said various radial distances r to determine a velocity of any one of said plurality of optical pulses launched into said core at some radial distance r relative to any other of said plurality of optical pulses launched into said core at some other radial distance r, and wherein said shift to the left is characterized by some of said plurality of optical pulses having a faster velocity relative to at least one other optical pulse having a slower velocity, said at least one other optical pulse having a slower velocity being launched into said core at a lower radial distance r than any of said some of said plurality of optical pulses having a faster velocity.

10. The MMF of claim 9, wherein said at least one other optical pulse having a slower velocity is launched into said core at a radial distance of 5 microns.

11. A multimode optical fiber (MMF) for operating within a spectral window, said MMF comprising:

a cladding having a refractive index of $n_2$; and a core, said core having a radius a and a refractive index profile comprised of refractive indices n(r) defined by a function of a radial distance r from a center of said core to a:

$$n(r) = n_1\sqrt{1-2\Delta\left(\frac{r}{a}\right)^\alpha}$$

where:

$n_1$ is a refractive index at said center of said core;

$\alpha$ is a parameter defining a shape of the refractive index profile; and $\Delta = (n_1 - n_2)/n_1$, said core further having an $\alpha_{opt}$ profile comprised of values $\alpha_{opt}(\lambda)$ defined by a function of wavelength $\lambda$, where for a given $\lambda$ said $\alpha_{opt}(\lambda)$ value minimizes a group delay of said MMF when said $\alpha$ is set equal to $\alpha_{opt}(\lambda)$, said $\alpha_{opt}$ profile having one of a concave shape with a maximum $\alpha_{opt}$ value or a convex shape with a minimum $\alpha_{opt}$ value, wherein a is less than or equal to said one of said maximum $\alpha_{opt}$ value or said minimum $\alpha_{opt}$ value.

12. The MMF of claim 11, wherein said $\alpha_{opt}$ profile is defined by:

$$\alpha_{opt}(\lambda) = 2 + y(\lambda) - \Delta\frac{(4+y(\lambda))(3+y(\lambda))}{5+2y(\lambda)},$$

where:

$$y(\lambda) = -\frac{2n_1}{N_1}\frac{\lambda}{\Delta}\frac{d\Delta}{d\lambda},$$

and where $N_1$ is a group refractive index of said core at r=0.

13. The MMF of claim 11, wherein a is less than said one of said maximum $\alpha_{opt}$ value or said minimum $\alpha_{opt}$ value.

14. The MMF of claim 11, wherein said spectral window is at least 50 nm, and wherein within said spectral window said MMF has an effective modal bandwidth of greater than 4700 MHz·km.

15. The MMF of claim 14, wherein said spectral window is at least 100 nm.

16. The MMF of claim 14, wherein said spectral window is at least 200 nm.

17. The MMF of claim 11, wherein a differential mode delay (DMD) plot of said MMF exhibits a shift to the left of its higher order modes relative to its lower order modes.

18. The MMF of claim 17, wherein said DMD plot is measured with an optical pulse of a wavelength within said spectral window.

19. The MMF of claim 17, wherein said DMD plot is measured by launching a plurality of optical pulses into one end of said core at various radial distances r and observing an arrival of said optical pulses at another end of said core at said various radial distances r to determine a velocity of any one of said plurality of optical pulses launched into said core at some radial distance r relative to any other of said plurality of optical pulses launched into said core at some other radial distance r, and wherein said shift to the left is characterized by some of said plurality of optical pulses having a faster velocity relative to at least one other optical pulse having a slower velocity, said at least one other optical pulse having a slower velocity being launched into said core at a lower radial distance r than any of said some of said plurality of optical pulses having a faster velocity.

20. The MMF of claim 19, wherein said at least one other optical pulse having a slower velocity is launched into said core at a radial distance of 5 microns.

* * * * *

UNITED STATES PATENT AND TRADEMARK OFFICE
CERTIFICATE OF CORRECTION

PATENT NO. : 9,632,244 B2
APPLICATION NO. : 14/806273
DATED : April 25, 2017
INVENTOR(S) : Jose M Castro et al.

Page 1 of 1

It is certified that error appears in the above-identified patent and that said Letters Patent is hereby corrected as shown below:

In the Claims

Column 19, Line 2, "Δ" should read --λ--.

Column 19, Line 7, "Δp" should read --λp--.

Column 20, Line 13, "a" should read --α--.

Column 20, Line 29, "a" should read --α--.

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*